(12) United States Patent
Manyam

(10) Patent No.: US 12,073,629 B1
(45) Date of Patent: Aug. 27, 2024

(54) SYSTEM FOR IDENTIFYING VEHICLES IN A FACILITY

(71) Applicant: AMAZON TECHNOLOGIES, INC., Seattle, WA (US)

(72) Inventor: Ohil Krishnamurthy Manyam, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 124 days.

(21) Appl. No.: 17/181,260

(22) Filed: Feb. 22, 2021

Related U.S. Application Data

(63) Continuation of application No. 14/134,692, filed on Dec. 19, 2013, now Pat. No. 10,929,661.

(51) Int. Cl.
*G06V 20/54* (2022.01)

(52) U.S. Cl.
CPC .................................. *G06V 20/54* (2022.01)

(58) Field of Classification Search
CPC .. G06V 20/62; G06V 40/1365; G06V 20/625; G06V 20/58; G06V 40/19
See application file for complete search history.

(56) References Cited

U.S. PATENT DOCUMENTS

| | | | | |
|---|---|---|---|---|
| 6,958,676 B1* | 10/2005 | Morgan | ............... | G07B 15/063 340/928 |
| 2004/0233036 A1* | 11/2004 | Sefton | .................... | G07B 15/04 340/5.53 |
| 2005/0110610 A1* | 5/2005 | Bazakos | ................ | G08G 1/207 340/5.82 |
| 2009/0055092 A1* | 2/2009 | Yokota | .................... | G01C 21/30 701/532 |
| 2011/0128381 A1* | 6/2011 | Bianco | ................... | G08G 1/017 348/149 |
| 2011/0145053 A1* | 6/2011 | Hashim-Waris | ....... | G16H 80/00 705/26.1 |
| 2011/0288909 A1* | 11/2011 | Hedley | .................. | G06Q 50/30 705/13 |
| 2012/0126939 A1* | 5/2012 | Chang | ................ | G07C 9/00563 340/5.53 |
| 2012/0197521 A1* | 8/2012 | Miyajima | .......... | G01C 21/3602 701/411 |
| 2013/0216102 A1* | 8/2013 | Ryan | .................. | G06Q 30/0281 382/105 |
| 2013/0297387 A1* | 11/2013 | Michael | ................. | G06Q 30/02 705/13 |

(Continued)

OTHER PUBLICATIONS

Cathey et al., A prescription for transit arrival/departure prediction using automatic vehicle location data, 2003, Transportation Research Part C 11 (2003): Emerging Technologies, vol. 11, Issues 3-4, pp. 241-264.*

*Primary Examiner* — Guillermo M Rivera-Martinez
(74) *Attorney, Agent, or Firm* — Lindauer Law, PLLC

(57) ABSTRACT

Described are systems and techniques for identifying users arriving at a facility based at least in part on a vehicle in which they arrive. In one implementation, vehicles are identified as they arrive at the facility. A candidate set of users previously associated with the identified vehicle is generated. The recognition system may then detect and identify the occupants of the vehicle using the candidate set. The identity of the vehicle may improve the accuracy of the user identification, reduce time to identify the user, or both.

21 Claims, 11 Drawing Sheets

(56) References Cited

U.S. PATENT DOCUMENTS

| | | | |
|---|---|---|---|
| 2013/0314210 A1* | 11/2013 | Schoner | G08B 13/2485 |
| | | | 340/8.1 |
| 2014/0104036 A1* | 4/2014 | Skonberg | G07C 9/28 |
| | | | 340/5.2 |
| 2015/0166009 A1* | 6/2015 | Outwater | B60R 25/25 |
| | | | 701/2 |

* cited by examiner

400

VEHICLE DATA
336

| VEHICLE IDENTIFIER 402 | TYPE 404 | VEHICLE REGISTRATION 406 | MAKE 408 | MODEL 410 | COLOR 412 |
|---|---|---|---|---|---|
| 1 | CAR | ADT 518 | ATLAS | AURES | YELLOW |
| 2 | BICYCLE | KSL 904 | ZAGROS | SIRJAN | RED |
| 3 | BUS | TXK 127 | ARAVALLI | ABU | WHITE |
| 4 | CAR | SAL 720 | CASCADE | SHUKSAN | SILVER |

...

ASSOCIATION DATA
338

| VEHICLE IDENTIFIER(S) 402 | USER IDENTIFIER 413 |
|---|---|
| 1,7 | ALICE |
| 1 | BOB |
| 7 | CHARLIE |
| 4 | TED |
| 3,4 | EMILY |

USER CHARACTERISTIC DATA
342

| USER IDENTIFIER 413 | BIOMETRIC DATA 414 | ID TAG 416 | GROUP DATA 418 |
|---|---|---|---|
| ALICE | SDKJ029385GHKZJD9FDG | 095310 | ALPHA |
| BOB | KL09843ZKLJDZLKJGN990 | 182322 | ALPHA |
| CHARLIE | K4359KLZGNDFGJAG8 | 262364 | ALPHA |
| TED | LKNDJ909JKLDKLJLKNKI | 336472 | MU, EPSILON |
| EMILY | 8903KADASD8F7A | 888455 | MU |

| VEHICLE SCHEDULE DATA 344 |||||
| --- | --- | --- | --- | --- |
| VEHICLE IDENTIFIER 402 | USER IDENTIFIER(S) 413 | DATE/TIME (ARRIVAL) 502 | DATE/TIME (DEPARTURE) 504 | DATA TYPE 506 |
| 1 | BOB | 20131209/09:14:02 | 20131209/09:27:03 | Historical |
| 7 | ALICE | 20131209/09:17:07 | (still present) | Historical |
| 3 | EMILY, TINA | 20131209/10:11:00 | 20131209/10:13:19 | Historical |
| 4 | TED, EMILY | 20131209/11:09:13 | 20131209/11:21:00 | Historical |
| 3 | TINA | 20131210/10:05:00 | 20131209/10:08:00 | Scheduled |
| 1 | BOB | 20131210/09:14:00 | 20131209/09:25:00 | Predicted |
| 5 | NICK | 20131213/09:05:00 | 20131213/09:45:00 | Predicted |

⋮

| USER IDENTIFICATION DATA 126 |||
| --- | --- | --- |
| USER IDENTIFIER(S) 413 | DATE/TIME 508 | STATUS 510 |
| Alice | 20131209/09:17:07 | In |
| Ted | 20131209/09:19:00 | Out |
| Alice | 20131209/10:16:00 | Out |
| Barb | 20131209/11:17:00 | In |

… # SYSTEM FOR IDENTIFYING VEHICLES IN A FACILITY

PRIORITY

This application is a continuation of, and claims priority to, U.S. patent application Ser. No. 14/134,692 filed on Dec. 19, 2013 titled "System For User Identification", the contents of which are incorporated by reference into the present disclosure.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. Users may arrive and leave the respective facilities such as the fulfillment centers, libraries, museums, rental centers, and the like. It is desirable to identify the users at the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4 and 5 illustrate block diagrams of different data processed by the server, according to some implementations.

Figure 1:
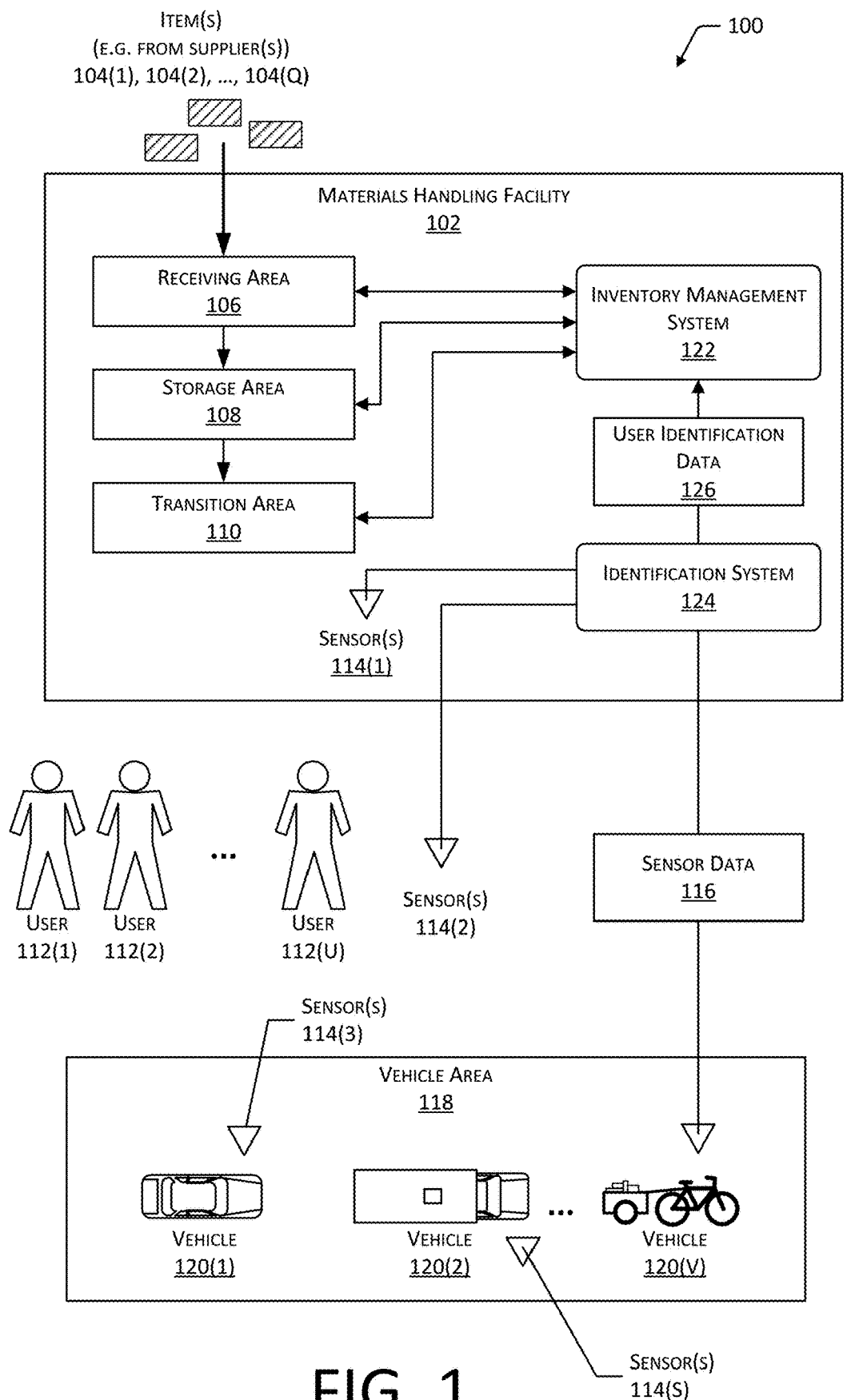
FIG. 1 is a block diagram illustrating a materials handling facility, according to some implementations, at which an identity of a user may be determined.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and techniques for determining an identity of a user of a facility. The determination may be based at least in part on information about a vehicle associated with the user. The user may be an employee, an inspector, a customer, a delivery person, an agent, a guest, and so forth.

The facility may include, or have access to, an inventory management system. The inventory management system may be configured to maintain information about items within the facility. For example, the inventory management system may maintain information indicative of quantities of items at various inventory locations.

The user may access the facility and interact with the inventory management system to perform one or more activities. For example, the user may arrive at the facility to inspect items available for delivery, or pick up one or more items for subsequent use or delivery. It may be advantageous to identify the user of the facility. Such identification may be used for time and attendance, audit logs, access control to the facility, or to otherwise support operation of the facility. The user may be provided with an opportunity to opt in or opt out of the identification functions described in this disclosure.

Users may arrive at, or depart from, the facility by way of a vehicle. The vehicles may include tractors, trucks, vans, buses, automobiles, bicycles, trains, aircraft, watercraft, and so forth. Each vehicle may convey zero or more users to or from the facility. For example, an autonomously guided automobile may arrive at the facility to pick up a user. In another example, several users may drive together in a single automobile and arrive at, then depart from, the facility.

The facility may include, or have access to, an identification system. The identification system may be configured to determine the identities of the users before or as they enter the facility. The identification system receives sensor data from a plurality of sensors. The sensors may include imaging devices such as cameras, radio receivers, biometric input devices, and so forth.

As a vehicle approaches, or enters the facility, the identification system is configured to identify the vehicle using sensor data. In some implementations, the identification system may use object recognition to detect the vehicle or a portion thereof that is represented in the sensor data. For example, an image recognition system may be configured to process an image acquired by a camera at an entry to a parking lot of the facility and perform optical character recognition to read a license plate affixed to the vehicle. The resulting data, comprising the license plate number, may then be used to identify the particular vehicle. Identification may be definitive in that a particular object, such as a unique vehicle or unique user, is distinguished from others. In some implementations, the identification may be less than certain. For example, the identification of a vehicle may include detecting the make, model, color, and so forth, and using two or more of these features in combination to determine the vehicle identification. Other information, such as vehicle schedule, user log data, and so forth may also be used to determine the vehicle identification.

Once the vehicle has been identified, the system may access association data to determine one or more user identities, which are associated with the vehicle. The association data provides a relationship between a particular vehicle and the particular user. For example, the automobile with a license plate value of "ADT 518" may be associated with the user "Alice". In other implementations, the association data may include less definitive relationships, such as an indication that users "Alice" and "Gwen" are associated with their own cars, each of which have a make "Atlas," model "Aures," and which are colored yellow.

The identification system may be configured to generate a candidate set. The candidate set includes the one or more user identities associated with the vehicle identity. The candidate set provides information indicative of the users who may possibly be occupying the vehicle. The candidate set may be considered a subset of at least a portion of user identities accessible to the system.

As described above, the identification system is configured to determine the identity of the user of the facility. The identity may be assigned arbitrarily by the identification system, such as a unique user identifier, or may be an identity with particular significance to the user or another entity, such as a given name or account name. For example, the user may be detected and identifiable as distinct from someone else, but the identification system may not have access to information such as the user's real name. As a result, in some implementations, the identification system may be configured to operate in a partially anonymous mode such that the individual user is distinguishable and identified but not necessarily named.

The identification system may determine user identity based on one or more aspects of the user themselves. For example, the identification system may be configured to detect and identify one or more of: a face of the user, gait, gender, height, relative distance between eyes, relative distance between eyes and nose, physical shape or configuration of a body part such as a hand or iris, voice, and so forth.

The facility may be configured to use the identification system to determine user identity upon the user's approach to the facility, or within a portal area. In some implementations, the user identity may be determined without the user pausing while entering the facility. For example, as the user walks in the door of the facility, they may be scanned and identified by the identification system without having to stop and otherwise interact with the identification system manually.

As the number of users increases, so too does the quantity of information associated with those users. As a population of users which may access the facility increases and the quantity of information increases, an amount of time needed for the system to identify the user may increase, reliability of the identification may be impacted, and so forth.

The identification system is configured to attempt to identify the user based at least in part on the candidate set. By constraining at least an initial attempt to identify the user to the candidate set, the identification system may realize one or more benefits. These benefits may include reduced processor and memory resources to complete the identification, reduced time to identify the user as compared to identifying the user from a set of all possible user identities, and so forth.

In some situations, the user identity may not have been previously associated with the vehicle identity. In these situations, the association data may be updated to associate the user identity with the vehicle identity. For example, the user may have purchased a new car or received a new set of license plates. The association data may be updated to relate the user with their new car.

The identification system may also be configured to determine groups of users and store this information as group data. In some implementations, the groups may be based on information associated with the vehicle. For example, five users exiting a vehicle may be determined to be members of a group. In another example, five users who enter a vehicle may be determined to be members of a group. Groups may include, but are not limited to, families, teams, clubs, work groups, peer groups, coworkers, workplace shiftmates, and so forth. Some users may be members of multiple groups.

The facility may include a material handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow for identification of vehicles and the use of this vehicle identification to identify the user. Once the user identity has been established, the inventory management system may use this information in a variety of ways. For example, the inventory management system may adjust to provide pick lists or other information associated with items to the user in a preferred language of that user, provide pick lists associated with that particular user, and so forth. The functionality may also include configuration of the inventory management system based at least in part on presence of a group. For example, the identification system may determine that a group, such as a team of workers, is approaching the facility and configure material handling equipment, such as one or more totes for use by members of the group.

Other systems associated with the facility may also take advantage of the user identification data. For example, the user identification data, including information about entry and exit times may be used by a time and attendance system to calculate payroll for employees of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(D)" indicate an integer value. The items 104 comprise physical goods, such as books, pharmaceuticals, repair parts, electronic gear, and so forth. The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations, such as aisles, pods, and so forth. The storage area 108 may include inventory locations such as shelves, racks, cases, cabinets, bins, floor locations, or other suitable storage mechanisms. The inventory locations may be affixed to the floor or another portion of the facility's structure, or may be movable such that the arrangements of aisles may be reconfigurable. In some implementations, the inventory locations may be configured to move independently of an outside operator. For example, the inventory locations may comprise a rack with a power source and a motor, operable by a computing device to allow the rack to move from one position within the facility 102 to another.

One or more users 112(1), 112(2), . . . , 112(U) may use the facility 102. The user 112 may be an employee, an inspector, a customer, a delivery person, an agent, a guest, and so forth.

One or more sensors 114 may be configured to acquire information about the users 112 in or around the facility 102. The sensors 114 are configured to produce sensor data 116. The sensors 114 may include, but are not limited to, radio frequency (RF) receivers, imaging devices configured to acquire images in one or more of terahertz light, infrared light, visible light, or ultraviolet light, weight sensors, biometric data acquisition devices, magnetometers, range cameras, and so forth. Other sensors 114 may be used, including motion sensors such as accelerometers or gyroscopes, pressure sensors, and so forth.

For ease of discussion, and not by way of limitation, the sensor data 116 may be designated as vehicle sensor data indicating information associated with the detection and identification of vehicles 120, or user sensor data, associated with the recognition and identification of users 112. In some implementations a single sensor 114, such as a camera, may perform the functions of a vehicle sensor and a user sensor. The sensors 114 are discussed in more detail below with regard to FIG. 2.

The facility 102 may include or be associated with a vehicle area 118. The vehicle area 118 may comprise one or more of a parking lot, parking facility, parking garage, bus station, train station, bike rack, airport ramp, marina, and so forth. The vehicle area 118 is configured to provide a location at which vehicles 120(1), 120(2), . . . , 120(V) may on-load or offload occupants, cargo, such as the items 104, or both. The vehicles 120 may park, dock, land, and so forth at the vehicle area 118. The vehicles 120 may include tractors, trucks, vans, buses, automobiles, bicycles, trains, aircraft, watercraft, and so forth. Each vehicle 120 may convey zero or more users 112 to or from the facility 102. In some implementations the vehicle area 118 may include services such as supervised parking, docking, and so forth. For example, a parking lot for automobiles may provide valet parking, while a marina may provide a pilot to dock the vessel.

The receiving area 106, the storage area 108, the transition area 110, the vehicle area 118, and so forth may be equipped with inventory locations storing the items 104, sensors 114, and so forth. Furthermore, the arrangement of the various areas of the facility 102 is depicted functionally rather than schematically. For example, in some implementations multiple different receiving areas 106, storage areas, 108, and transition areas 110 may be interspersed rather than segregated. In another implementation, the receiving area 106 may be incorporated into a portion of the vehicle area 118.

The facility 102 may include, or be coupled to, an inventory management system 122. The inventory management system 122 is configured to interact with the users 112 or devices such as the sensors 114, robots, material handling equipment, computing devices, and so forth in one or more of the receiving area 106, the storage area 108, the transition area 110, or the vehicle area 118.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at the receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations such as in bins, on shelves, hanging from pegboards, and so forth. In this implementation, all items 104 of a given kind are stored in one inventory location. In other implementations, like items 104 may be stored in different inventory locations. For example, to optimize retrieval of certain items 104 having high turnover within a large physical facility, those items 104 may be stored in several different inventory locations to reduce congestion that might occur at a single inventory location.

When a customer order specifying one or more items 104 is received, or as a user progresses through the facility 102, the corresponding items 104 may be selected or "picked" from the inventory locations containing those items 104. In various implementations, item picking may range from manual to completely automated picking. For example, in one implementation, a user 112 may have a list of items 104 they desire and may progress through the facility 102 picking items 104 from inventory locations within the storage area 108, and placing those items 104 into a tote. In other implementations, employees of the facility 102 may pick items 104 using written or electronic pick lists derived from customer orders. These picked items 104 may be placed into a tote as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The facility 102 includes, or has access to, an identification system 124. The identification system 124 is configured to determine the identity of users 112 before or as they enter the facility 102. The identification system 124 is configured to process the sensor data 116, as generated by a plurality of sensors 114. The sensors 114 may include imaging devices such as cameras, radio receivers, biometric input devices, and so forth.

As the vehicle 120 approaches or enters the facility 102, the identification system 124 is configured to identify the vehicle 120 using the sensor data 116. In some implementations, the identification system 124 may use object recognition to detect the vehicle 120, or a portion thereof, as represented in the sensor data 116. For example, an image recognition system may be configured to process an image acquired by a camera at an entry to a parking lot of the facility 102 and perform optical character recognition to read a license plate affixed to the vehicle. For example, a portion of the image corresponding to the license plate may be determined, and one or more of the characters of the license plate may be recognized using optical character recognition. The resulting data, comprising the license plate number, may then be used to identify the particular vehicle 120.

As described in this disclosure, identification may be definitive in that a particular object such as a unique vehicle or unique user is distinguished from others. In some implementations, the identification may be less than completely certain. For example, the identification of a vehicle 120 may include detecting the make, model, color, and so forth, and using two or more of these features in combination to determine the vehicle identification. Other information, such as vehicle schedules, user log data, and so forth may also be used to determine the vehicle identification.

Once the vehicle 120 has been identified, the identification system 124 may access association data to determine one or more user identities which are associated with the vehicle 120. The association data provides a relationship between a particular vehicle and the particular user. The association data may provide a direct or indirect association between the user 112 and the vehicle 120. For example, the automobile with a license plate value of "ADT 518" may be associated with the user "Alice". This information may be obtained from vehicle registration databases, insurance databases, vehicle repair or maintenance databases, and so forth. Continuing the example, the license plate value of "ADT 518" may be queried against an insurance company database to determine the name of a policyholder associated with that vehicle 120. In some implementations the association data may be based on previous visits of the user 112 and the vehicle 120 to the materials handling facility 102, as described herein.

In another example, multiple data sources may be combined to determine the association indirectly. For example, the license plate may be associated with vehicle sharing or rental service. The license plate value for a vehicle 120 may be used to query the rental service and receive information indicative of the current driver assigned to that vehicle 120.

In other implementations, the association data may include less definitive relationships. For example, the association data may indicate that the user identities of users "Alice" and "Gwen" are associated with cars having a make "Atlas," model "Aures," and which are colored yellow.

The identification system 124 may be configured to generate a candidate set. The candidate set includes the one or more identities associated with the vehicle identity. The candidate set provides information indicative of the users 112 who may possibly be occupying the vehicle 120. The candidate set may be considered a subset of at least a portion of the user identities accessible to the identification system 124. In some implementations the candidate set may be configured to exclude employees or agents who facilitate the stowage of vehicles 120. For example, harbor pilots, valet parking attendants, aircraft tow vehicle operators, and so forth may be excluded from the candidate set.

The identification system 124 is configured to determine the identity of the user 112 of the facility 102 and generate user identification data 126. The user identity may be assigned arbitrarily by the identification system 124. For example, as users 112 are distinguished from one another, a unique identification number generated by the system 100 may be assigned to each.

The user 112 may be detected and identifiable as distinct from someone else, but the identification system 124 may not have access to other information, such as the user's name. As a result, in some implementations, the identification system 124 may be configured to operate in a partially anonymous mode such that the individual user 112 is distinguishable within the identification system 124 and thus identifiable, but not necessarily named. In other implementations, the user identity may comprise information with particular significance to the user 112 or another entity, such as a real name or an account name.

The identification system 124 may determine user identity based on one or more aspects of the user 112 themselves, such as biometric information. For example, the identification system 124 may be configured to detect and identify one or more of: a face of the user 112, gait, gender, height, physical shape or configuration of a body part such as a hand or iris, voice, and so forth. In some implementations, physical tags or markings may also be used instead of, or in addition to, biometrics, to determine identity. For example a radio frequency identification (RFID) tag may be used to assist in identifying the user 112.

The identification system 124 may use the candidate set to reduce the amount of information which is processed to determine the user identity. For example, upon approach to the facility 102 the vehicle 120 associated with the user 112 is identified. Based on the previously acquired association data, the identification system 124 is able to determine a candidate set indicating that the occupants of the vehicle 120 may be one of three possible user identities, "Alice," "Bob," or "Jim." As the user 112 exits the vehicle 120, the sensors 114 gather sensor data 116 which is used to analyze the user 112 as compared against the candidate set comprising the three possible user identities and determine that the user's identity is "Alice". In comparison, without the candidate set, the identification system 124 may need to search information associated with significantly more user identities to identify "Alice". Thus, the candidate set may be considered to act as a cue for the identification system 124 to use in determining the user identity.

In some situations, the user identity may not have been previously associated with the vehicle identity. For example a new user 112 may begin to access the facility 102, an existing user 112 may use a different vehicle 120 to travel to the facility 102, or particular aspects of the vehicle 120 may change, such as receiving new license plates, being repainted, and so forth. The identification system 124 may update association data to establish a relationship between the user identity and the vehicle identity. For example, the user 112 "Jake" may have purchased a new car and the association data may be updated accordingly. Continuing the example, at subsequent visits to the facility 102, "Jake's" new car is detected as being associated with "Jake," and a corresponding candidate set including "Jake" is generated by the identification system 124. Operation of the identification system 124 and the data associated therewith is discussed in more detail in the following figures.

The facility 102 may be configured to use the identification system 124 to determine user identity upon the user's approach to the facility 102, such as while in the vehicle area 118. In another implementation, the user's identity may be ascertained at a portal area, such as within a foyer. The user identity may be determined without the user 112 pausing or stopping during entry to the facility 102. For example, as the user 112 walks in the door of the facility 102, sensor data 116 about the user 112 is acquired and processed by the identification system 124 to determine the user identity without the user 112 stopping to interact manually with the identification system 124.

The identification system 124 may operate in conjunction with the inventory management system 122 or other systems. For example, the identification system 124 may provide the user identification data 126 to the inventory management system 122. The inventory management system 122 may then generate a pick list associated with the identified user 112. In another example, the user identification data 126 may be used to generate time and attendance data for determination of a payroll of the employee users 112.

Figure 2:
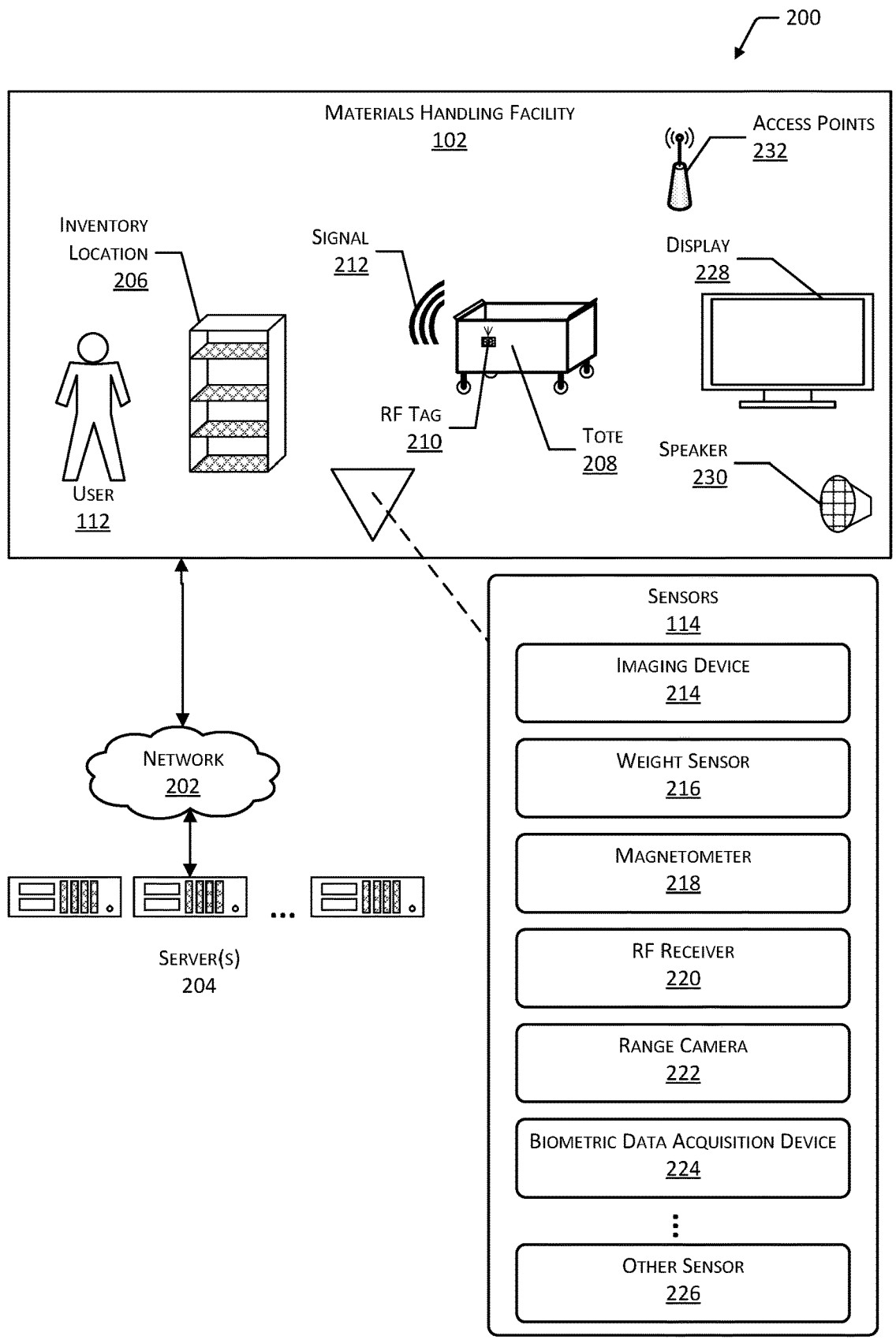
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., RF, IR, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., RF, cellular, microwave, satellite), or other connection technologies.

The servers 204 may be configured to execute one or more modules or software applications associated with the inventory management system 122, the identification system 124, and so forth. While the servers 204 are illustrated as being in a location outside of the facility 102, in other implementations at least a portion of the servers 204 may be located at the facility 102. The servers 204 are discussed in more detail below with regard to FIG. 3.

As described above, one or more users 112 may enter, exit, or otherwise move about the facility 102. The users 112 may pick, place, inspect, or otherwise interact with the items 104 as stored in one or more inventory locations 206. The inventory locations 206 may include shelves, racks, cases, cabinets, bins, floor locations, or other suitable storage mechanisms. The inventory locations 206 may be affixed to the floor or another portion of the facility's structure, or may be movable such that the arrangements of aisles may be reconfigurable.

In some implementations, the inventory locations 206 may be configured to move independently of an outside operator. For example, the inventory locations 206 may comprise a rack with a power source and a motor, operable by a computing device to allow the rack to move from one position within the facility 102 to another.

The user 112 may use a tote 208 configured to carry or otherwise transport one or more items 104 within, to or from the facility 102. For example, the tote 208 may include a basket, a cart, a bag, and so forth. In some implementations, the tote 208 may include a radio frequency (RF) tag 210. The RF tag 210 is configured to emit an RF signal 212. In one implementation, the RF tag 210 may be a radio frequency identification (RFID) tag configured to emit the RF signal 212 upon activation by an external signal. For example, the external signal may comprise a radio frequency signal or a magnetic field configured to energize or activate the RFID tag. In another implementation, the RF tag 210 may comprise a transmitter and a power source configured to power the transmitter. For example, the RF tag 210 may comprise a Bluetooth Low Energy (BLE) transmitter and battery. In other implementations, the tag may use other techniques to indicate presence. For example, an acoustic tag may be configured to generate an ultrasonic signal. The tag may also comprise a machine-readable optical tag, such as a barcode.

In some implementations, the user 112 may also be provided with an RF tag 210. For example, the user 112 may carry a key fob containing the RF tag 210.

Generally, the inventory management system 122, the identification system 124, or other systems associated with the facility 102 may include any number and combination of input components, output components, and servers 204.

The one or more sensors 114 are configured to generate the sensor data 116. The sensors 114 may include other components capable of receiving input about the environment. For example, the sensor data 116 may provide information associated with the items 104, the user 112, the vehicle 120, the tote 208, and so forth.

The sensors 114 may include an imaging device 214. The imaging device 214 is configured to acquire an image in one or more of terahertz light, infrared light, visible light, or ultraviolet light. For example the imaging device 214 may comprise an infrared camera. The sensor data 116 provided by the imaging device 214 may include still or video images. These images may be used to identify an object such as the user 112, the vehicle 120, an item 104, and so forth.

A weight sensor 216 is configured to determine a weight of an object, such as the vehicle 120, the user 112, the totes 208, the items 104, and so forth. The weight sensor 216 may comprise one or more load cells configured to provide data indicative of the weight of an object placed thereon, or upon a platform coupled thereto. The weight may then be used at least in part to determine the vehicle identification, the user identification, or both. In some implementations the weight sensors 216 may be arranged in the vehicle area 118, in the facility 102 such as within at least a portion of the floor, on the inventory locations 206, in the totes 208, and so forth.

A magnetometer 218 may be configured to determine changes in magnetic field direction, intensity, or both. The magnetometer 218 may comprise one or more solid-state devices such as a Hall-effect detector. The magnetometer 218 may be used to determine a magnetic profile of a large ferrous object such as a vehicle 120. In some implementations, the magnetic profile may be used at least in part to determine the vehicle identification.

An RF receiver 220 is configured to receive RF signals 212. The RF receiver 220 may be configured to receive the RF signals 212 emitted by the RF tag 210. The RF receiver 220 may also be configured to detect transmissions from other devices, such as a wireless communication interface. For example, the RF receiver 220 may be configured to detect a Bluetooth signal emitted by a Bluetooth communication interface which is installed in the vehicle 120. In some implementations the RF receiver 220 may be coupled with an RF transmitter. For example a wireless access point may be used to acquire sensor data 116 indicative of one or more wireless devices associated with the user 112, the vehicle 120, or both. The RF receiver 220 may be compatible with one or more wireless communication systems including but not limited to Bluetooth, ZigBee, Wi-Fi, 3G, 4G, Long Term Evolution (LTE), Wi-Max, and so forth.

The sensors 114 may also include a range camera 222. The range camera 222 is configured to generate information indicative of a three-dimensional object. For example the range camera 222 may be configured to generate sensor data 116 comprising a three-dimensional point cloud. The range camera 222 may use one or more techniques including stereo triangulation, sheet of light triangulation, structured light, time-of-flight, interferometry, coded aperture, and so forth to gather depth data associated with an image. The sensor data 116 provided by the range camera 222 may be used for identification by providing information as to size, shape, texture, and so forth.

Biometric data acquisition devices 224 may also be included in the sensors 114. The biometric data acquisition devices 224 are configured to acquire biometric information about one or more characteristics or traits of the user 112. The biometric data acquisition devices 224 may include fingerprint readers, hand geometry scanners, retinal scanners, iris scanners, microphones for voice analysis, and so forth.

Other sensors 226 may also be provided, such as lidar, radar, acoustic sensors, microbolometers, Interpolating Force-Sensitive Resistance (IFSR) sensors, motion sensors, microphones, touch sensors, and so forth. For example, an acoustic sensor may be configured to detect engine noise of the vehicle 120, which may then be used by the identification system 124 to determine the identity of the vehicle 120.

In some implementations the other sensors 226 may include devices which are owned or operated by an external entity. For example, a public transportation system may provide information associated with the real-time positioning of buses to the identification system 124. In another example, data acquired by a toll road monitoring station which provides vehicle access to the facility 102 may be provided to the identification system 124.

The one or more sensors 114 may be placed in various locations associated with the facility 102. Sensors 114 may be located within the facility 102, at entry and exit points of the facility 102, within the vehicle area 118, at entry and exit points to the vehicle area 118, and so forth. In some implementations, the sensors 114 may be positioned at a distance from the facility 102. For example, a camera may be configured to capture license plate numbers of the vehicles 120 in a turn lane which leads to the vehicle area 118.

For ease of description, and not by way of limitation, some of the sensors 114 may be designated as user sensors, vehicle sensors, or both. For example, user sensors may include imaging devices 214 and biometric data acquisition devices 224, while vehicle sensors may include imaging devices 214 and magnetometers 218. As illustrated, in some implementations a single sensor 114, such as an imaging device 214, may be configured to provide sensor data 116 about the user 112, the vehicle 120, or both.

The facility 102 may also include output devices. These output devices are configured to present information to users 112 or otherwise provide output to the surrounding environment. In the implementation depicted here, the facility 102 may include one or more displays 228. The displays 228 may include electronically addressable displays configurable to present a visual image. For example, the displays 228 may include projectors, liquid crystal displays, cathode ray tubes, plasma displays, and so forth. One or more speakers 230 may also be available to present audible output. Other output devices (not depicted) may also be present, such as printers, haptic output devices, and so forth.

In some implementations, the sensors 114, the output devices, or both may be incorporated into the tote 208, the inventory locations 206, and so forth. For example the tote 208 may include one or more displays 228, touch sensors to accept input, as well as one or more motion sensors such as accelerometers, gyroscopes, tilt sensors, and so forth.

The facility 102 may include one or more access points 232 configured to establish one or more wireless networks. The access points 232 may use Wi-Fi, near field communication (NFC), Bluetooth, or other technologies to establish wireless communications between a device and the network 202. The wireless networks allow the devices to communicate with one or more of the inventory management system 122, the identification system 124, the sensors 114, the RF tag 210, a communication device of the tote 208, or other devices.

Figure 3:
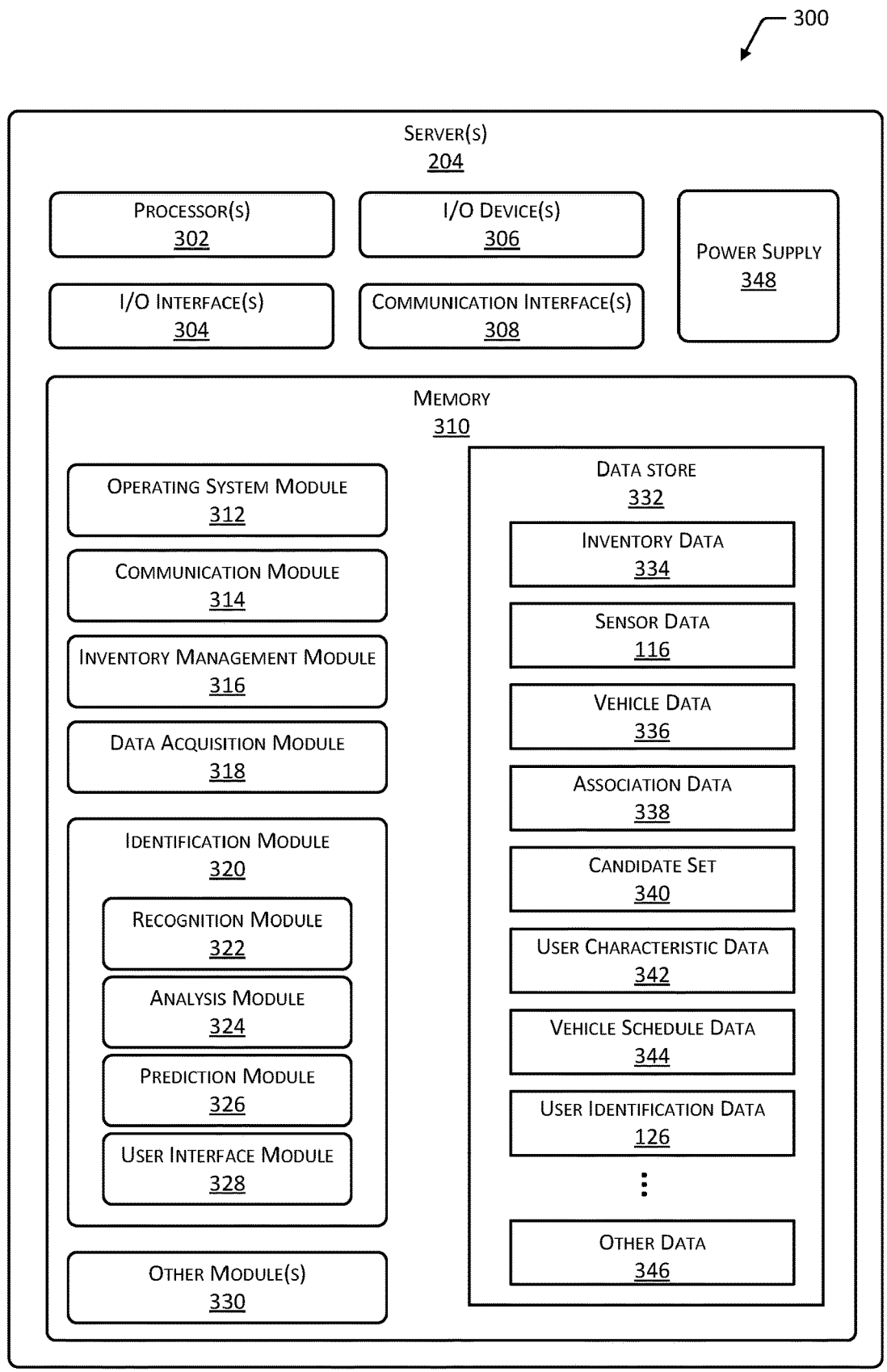
FIG. 3 illustrates a block diagram of a server configured to identify users of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service" (SaaS), "platform computing," "network-accessible platform," "cloud services," "data centers", and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 114, routers, the access points 232, and so forth. The communication interfaces 308 may include devices configured to couple to personal area networks (PANS), wired and wireless local area networks (LANs), wired and wireless wide area networks (WANs), and so forth. For example, the communication interfaces 308 may include devices compatible with Ethernet, Wi-Fi, and so forth.

The server 204 may also include one or more buses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variation of the Linux operating system as promulgated by Linus Torvalds, the Windows Server operating system from Microsoft Corporation of Redmond, Washington, and so forth.

Also stored in the memory 310 may be one or more of the following modules. These modules may be executed as foreground applications, background tasks, daemons, and so forth.

A communication module 314 may be configured to establish communications with one or more of the sensors 114, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 206.

The inventory management module 316 may be configured to access the user identification data 126 and modify operation based at least in part on the user identity. For example, based upon the approach of the user 112 to the facility 102, the inventory management module 316 may prepare customized pick lists associated with that user 112 and may allocate and configure a tote 208 for use. Thus the inventory management module 316 may be responsive to the particular user 112.

A data acquisition module 318 is configured to acquire the sensor data 116 from the one or more sensors 114. For example, the data acquisition module 318 may be configured to poll the sensors 114 and access the sensor data 116.

The memory 310 may also store an identification module 320 configured to provide the user identification data 126 as described herein with regard to the identification system 124. The identification module 320 is configured to access the sensor data 116 received from the one or more sensors 114 and generate the user identification data 126. In some implementations, the identification module 320 may be configured to use one or more probabilistic techniques to generate the user identification data 126.

The identification module 320 may include, or have access to, one or more of a recognition module 322, an analysis module 324, a prediction module 326, or a user interface module 328. The recognition module 322 is configured to detect objects such as the users 112, the vehicles 120, the items 104, and so forth. The recognition module 322 may include a facial recognition module configured to detect a human face within an image. The recognition module 322 may use neural networks, heuristic algorithms, genetic algorithms, classifiers, and so forth to generate machine usable information about the object. In one implementation, the recognition module 322 may implement an artificial neural network which uses deep learning techniques in which the neural network has been trained to recognize particular objects. In other implementations, the recognition module 322 may use other techniques such as edge matching, interpretation trees, geometric hashing, scale-invariant feature transform (SIFT) as published by David Lowe, speeded up robust features (SURF) which is based on sums of approximated two-dimensional Haar wavelet responses as published by Herbert Bay et. al, and so forth. The recognition module 322 may use one or more of these techniques in combination to detect objects.

The recognition module 322 may include a vehicle recognition module configured to detect a vehicle 120 within an image. In some implementations, the recognition module 322 may implement one or more classifiers configured to determine one or more characteristics associated with the vehicle 120. For example, the classifier may be configured to determine a body style of the vehicle 120. The classifier may implement one or more statistical analysis techniques, such as logistic regression, cluster analysis, and so forth.

The recognition module 322 may also provide text recognition, such as optical character recognition suitable for reading license plates, bumper stickers, text written on clothing of the user 112, and so forth. For example the recognition module 322 may read the license plate of a vehicle 120 entering the vehicle area 118 as "ADT 518" and provide this information to the analysis module 324 for further use.

The recognition module 322 may be configured to accept one or more different types of sensor data 116. The recognition module 322 may be configured to use data fusion techniques to process sensor data 116 acquired from different types of sensors 114 to detect an object.

The analysis module 324 is configured to access information provided by the recognition module 322 to determine an identity of the object. The analysis module 324 may be configured to compare information generated by the recognition module 322 with previously stored information.

The analysis module 324 may be configured to determine a vehicle identity of the vehicle 120. For example, the recognition module 322 may provide data indicative of the license plate of the vehicle 120 as it enters the vehicle area 118. The analysis module 324 may access the license plate information and compare it with previously stored vehicle data to generate a vehicle identification. For example the system may have previously stored data indicating that the license plate "ADT 518" is associated with the vehicle identifier of "1".

The analysis module 324 may use the vehicle identification to generate a candidate set. The candidate set includes the one or more user identities which are associated with the vehicle identity, providing information indicative of the users 112 who may possibly be occupying the vehicle 120. The vehicle identification may be less than absolute. For example, a license plate may be obscured and the analysis module 324 may generate a vehicle identification indicating the vehicle 120 is a red coupe with a spoiler mounted on the trunk. As a result, the candidate set may include user identities for a plurality of vehicle identities, such as the users 112 associated with all known red coupes with a spoiler on the trunk.

In some implementations, the vehicle identifications which are used to generate the candidate set may be selected based at least in part on a confidence value. The confidence value may provide an indication of reliability of the vehicle identification. For example, vehicle identifications which are above a confidence value of 50% may be used to find the user identities for the candidate set.

The candidate set may be considered a subset of at least a portion of user identities accessible to the identification system 124. In some implementations the candidate set may be generated by performing a query using the vehicle identification against the association data which relates one or more vehicle identifiers with one or more user identifiers. The association data is discussed in more detail below with regard to FIG. 4. Continuing the example, the vehicle identifier of "1" may be associated with the users 112 "Alice" and "Bob," thus the candidate set comprises the users 112 "Alice" and "Bob".

The analysis module 324 may be configured to determine the user identity by analyzing one or more characteristics of the sensor data 116 which are indicative of the user 112. These characteristics may be compared with previously stored user characteristic data to determine the user identity. For example information about facial characteristics may be stored and used by the analysis module 324 to identify the user 112 based at least in part on an image of their face.

The recognition module 322, the analysis module 324, or both, may also include one or more classifiers. The classifier may utilize one or more of machine learning or statistical techniques to classify the vehicle 120 and use this classification to generate the candidate set.

With the candidate set now available, the analysis module 324 may process the sensor data 116 to determine the user identities of the occupants of the vehicle 120. By using the candidate set as generated based on the vehicle identification, the analysis module 324 is able to significantly improve performance of the identification, accuracy of the identification, or both. For example, rather than attempting to match the facial characteristics of the user 112 with every face previously stored, the analysis module 324 may instead analyze the sensor data 116 with regard to the two users 112 "Alice" and "Bob". As a result a more detailed analysis may be performed on a smaller data set. This may result in reduced time for identification, a reduction in compute resources used for the identification, an increase in the accuracy of the identification, or both. Accuracy of the identification may be improved by using the vehicle identification or characteristics of the vehicle to determine the user identity. For example, the color, make, and model of the vehicle may provide inputs which may be combined with the facial characteristics to determine the user identity.

In some implementations, the identification module 320 may operate in a classifier-based recognition mode. In this mode, the identification module 320 may process the sensor data 116 with one or more classifiers configured to determine one or more characteristics of the vehicle 120 and the user 112 without generating the candidate set. For example, the characteristics may include things such as vehicle body style, vehicle color, height of the user 112, a distance between eyes of the user 112, and so forth. These characteristics may then be processed and used to determine the user identity. For example, these characteristics may be used as input signals or feature vectors from which the identification module 320 may generate one or more probabilities associated with the user identity.

The prediction module 326 may be configured to use vehicle schedule data, as described elsewhere in this disclosure, to provide additional inputs to the recognition module 322, the analysis module 324, or both.

The prediction module 326 may access vehicle schedule data to predict dates and times of a user's next appearance at the facility 102. For example, the recognition module 322 may provide data indicative of the user 112 "Emily" arriving and departing the facility 102 by bus. The analysis module 324 may be configured to match the user 112 "Emily" with a particular bus number. The prediction module 326 may be configured to use this information to determine that the user 112 "Emily" will likely appear at the facility 102 at a particular time tomorrow corresponding to the scheduled arrival time of the particular bus which "Emily" has been observed to arrive on.

In some situations, the user identity of the user 112 arriving at the facility 102 may not be included in the candidate set. For example, the user 112 may have purchased a new vehicle 120, changed the license plates of the vehicle 120, a different user 112 may have borrowed the vehicle 120, and so forth. In these situations the analysis module 324 may proceed to determine the user identity using other mechanisms.

The analysis module 324 may use the user interface module 328 to accept user input. For example, the unrecognized user 112 may be asked to provide input using a user interface at the portal of the facility 102 before access to the remainder of the facility 102 is allowed. The portal may be configured to present the user interface as provided by the user interface module 328 and acquire information such as biometric data, data from an access token such as an RF ID tag or NFC card, manual data entry on a keyboard, and so forth. The analysis module 324 may then be configured to associate this newly acquired information with the user 112, and establish the user identity with regard to the identification system 124.

The user interface module 328 may also be used to acquire or confirm information associated with the user 112. The user interface module 328 may be configured to present to the user 112 information based on the sensor data 116 to confirm the association between the user 112 and the vehicle 120. For example, the user interface module 328 may present an image of the vehicle 120 to the user 112 and ask the user 112 for input confirming that this is their vehicle 120. In some implementations, the information presented by the user interface module 328 in the user interface may be intentionally obfuscated. For example, faces of people appearing within the vehicle 120 may be blurred or otherwise removed from the presented image. In another example, text of bumper stickers may be blurred or removed from the presented image. The input from the user interface module 328 may be used to further enhance operation of the recognition module 322, the analysis module 324, the prediction module 326, and so forth.

In some implementations the user interface module 328 may also be used to confirm information generated by the prediction module 326. For example the user 112 may be presented with the user interface asking the user 112 to confirm that they usually arrive at the facility 102 using the bus. Based on this input, the prediction module 326 may refine future predictions.

The user interface module 328 may be configured to provide a user interface which is graphical, character based, audible, haptic, or a combination thereof. For example, in some implementations the user interface may comprise voice prompts presented using the speaker 230.

Other modules 330 may also be present in the memory 310. For example, a time and attendance module may be configured to access the user identification data 126 to determine a quantity of hours in which an employee was within the facility 102.

The memory 310 may also include a data store 332 to store information. The data store 332 may use a flat file, database, linked list, tree, executable code, script, or other data structure to store the information. In some implementations, the data store 332 or a portion of the data store 332 may be distributed across one or more other devices including other servers 204, network attached storage devices and so forth.

The data store 332 may include inventory data 334. The inventory data 334 may comprise information associated with the items 104. The information may include one or more inventory locations, at which one or more of the items 104 are stored. The inventory data 334 may also include price, quantity on hand, weight, expiration date, and so forth. The inventory management module 316 may store information associated with inventory management functions in the inventory data 334.

The data store 332 may also store the sensor data 116. As described above, the identification module 320 may access the sensor data 116. The sensor data 116 may include images, video, weights, three-dimensional point cloud data, temperatures, pressures, sounds, information received from the RF receivers 220, magnetic field data, biometric information, and so forth.

Vehicle data 336 may also be stored in the data store 332. The vehicle data 336 comprises information indicative of one or more vehicles 120 including the vehicle identifiers and one or more characteristics associated with the vehicle 120. The analysis module 324 may use the vehicle data 336 to determine the vehicle identity. The vehicle data 336 is discussed in more detail below with regard to FIG. 4.

Association data 338 provides information indicative of a relationship between one or more vehicle identifiers and one or more user identifiers. For example the association data 338 may indicate that the vehicle identifier "1" is associated with the user 112 "Bob". The association data 338 is discussed in more detail below with regard to FIG. 4.

A candidate set 340 comprises information indicative of one or more user identities. As described above the candidate set 340 may be generated at least in part by the analysis module 324. The candidate set 340 may be generated in real time, or near real-time, such as within seconds of receiving sensor data 116. Furthermore, the candidate set 340 may change over time as additional sensor data 116 becomes available for use. For example, first candidate set 340 may be generated based on a color of the vehicle 120 as determined by an image of the vehicle 120 upon entry to the vehicle area 118. A second candidate set 340 may be generated as a body style of the vehicle 120 is determined, and so forth. As described above, one or more classifiers may be used to determine the vehicle identity, the user identity, or both.

User characteristic data 342 may also be stored in the data store 332. The user characteristic data 342 provides information which may be used by the analysis module 324 to determine the user identity. The user characteristic data 342 is discussed in more detail below with regard to FIG. 4.

Vehicle schedule data 344 which may be stored in the data store 332 provides information about vehicles 120 arriving, departing, scheduled arrivals or departures, or predictions for arrival or departure. The vehicle schedule data 344 may include historical data that is indicative of one or more previous arrivals or departures of the user 112, the vehicle 120, or both, at the facility 102. In some implementations the vehicle schedule data 344 may also include information indicative of the user identities of the occupants of the vehicles 120 at those arrivals or departures. The vehicle schedule data 344 is discussed in more detail below with regard to FIG. 5.

The data store 332 may also store the user identification data 126. The user identification data 126 may include information indicative of the user identity, such as a user identifier. In some implementations the user identification data 126 may include other information such as a date/time of entry or exit to the facility 102 or a portion thereof. Status information indicative of whether the user 112 has entered or exited the facility 102 may also be stored. The user identification data 126 is discussed in more detail below with regard to FIG. 5.

The data store 332 may store other data 346 as well, such as user preferences, configuration files, permissions associated with user accounts, time and attendance data, and so forth.

The server 204 may also include a power supply 348. The power supply 348 is configured to provide electrical power suitable for operating the components in the server 204.

FIGS. 4 and 5 illustrate block diagrams of different data processed by the server 204. Depicted in FIG. 4 are block diagrams 400 of the vehicle data 336, the association data 338, and the user characteristic data 342. Depicted in FIG. 5 are block diagrams 500 of the vehicle schedule data 344 and the user identification data 126.

The vehicle data 336 provides information associated with a particular vehicle identity. Vehicle identity may be expressed as a vehicle identifier 402. The vehicle identifier 402 may comprise a string or other data configured to operate as a reference with which information associated with the particular vehicle 120 may be accessed or otherwise manipulated. In some implementations the identification system 124 may be configured to generate the unique vehicle identifier 402.

The vehicle data 336 may include, but is not limited to, one or more of a type 404 of vehicle 120, vehicle registration 406, make 408 of the vehicle 120, model 410 of the vehicle 120, color 412 of the vehicle 120, and so forth. The type 404 of vehicle 120 may indicate the type of conveyance, such as a car, a bicycle, a bus, a van, truck, a train, and so forth. The vehicle registration 406 provides information indicative of a license number, registration number, vehicle identification number, part identification number of one or more identifiable parts of the vehicle 120, or other identifying data as provided by another entity such as a government, fleet operator, manufacturer, and so forth. In some implementations the vehicle registration 406 may be used as the vehicle identifier 402.

The make 408 of the vehicle 120 provides information associated with the manufacturer or nameplate of the vehicle 120. The model 410 may be indicative of a particular chassis, body style, and so forth. The color 412 of the vehicle 120 may indicate a color scheme associated with the vehicle 120. The color 412 may be indicative of an overall color of the vehicle 120, or may be color associated with a particular portion of the vehicle 120, such as of a roof or hood of an automobile.

In some implementations the vehicle data 336 may include other characteristics which may be used to ascertain the vehicle identity. The vehicle data 336 may include information about one or more characteristics such as: body damage, bumper stickers or other decals affixed to the vehicle 120, weight, identifiers associated with radio frequency communication interfaces, aftermarket add-ons, presence of window tint, license plate frame, and so forth. For example, a wheel style may be stored comprising data indicative of a particular set of wheels or rims used by the vehicle 120. In another example, a Bluetooth media access control (MAC) address maybe be broadcast by an in-vehicle entertainment system. The MAC address may be obtained by the RF receiver 220 and stored in the vehicle data 336.

The vehicle identity may be considered indicative of the vehicle's inclusion in a set of vehicles 120. The set of vehicles 120 may be defined by one or more of the characteristics described above. As a result, in some situations the vehicle identity may not be definitive. For example, a vehicle without a license plate may be identified based on the type 404, make 408, model 410, color 412, distinguishing characteristics, and so forth. The vehicle identification in this situation may have a confidence value which is indicative of the uncertainty associated with the identification.

As described above, the association data 338 establishes a relationship between one or more vehicle identifiers 402 and one or more user identifiers 413. For example, as illustrated here, the vehicle identifiers 402 of "1" and "7" are associated with the user identifier 413 for the user 112 "Alice". The user identifiers 413 may comprise a string or other data configured to operate as a reference with which information associated to the particular user 112 may be accessed or otherwise manipulated. In these examples, for ease of illustration and not by way of limitation, the user identifier 413 is depicted as a string comprising the user's first name. The association data 338 may include a confidence metric or other information indicative of reliability or strength of the association between the vehicle identifier 402 and the user identifier 413. In some implementations, the identification module 320 may use the confidence metric to generate the candidate set 340, generate the user identification data 126, and so forth. Confidence metrics may be available for each unique combination of the vehicle identifier 402 and user identifier 413.

In some situations, users 112 and their corresponding user identifiers 413 may be unassociated with vehicle identifiers 402. For example, a new user 112 arriving at the materials handling facility 102 for the first time may have no entry in the association data 338, or may have an incomplete entry in the association data 338. Continuing the example, the incomplete entry may include information about the user's identity such as a picture or other biometric information which has been received from another system, such as a payroll system or new user registration system.

The user characteristic data 342 provides information about one or more characteristics of the user 112. The analysis module 324 or other modules may use one or more of these characteristics to determine the user identity, group users 112 together, and so forth. The user characteristic data 342 may include a user identifier 413 as described above, biometric data 414, an identification (ID) tag 416, group data 418, and so forth. The biometric data 414 may store information associated with one or more biometric attributes associated with, and indicative of, the user 112. For example the biometric data 414 may include information associated with arrangement of facial features, iris pattern, voice patterns, and so forth. The ID tag 416 may comprise information associated with the RF tag 210 or other tag which is associated with the user 112. For example, the ID tag 416 may correspond to information stored by an RFID or NFC tag within a key fob carried by the user 112. In another example, the ID tag 416 may correspond to information stored by a machine-readable optical identification tag associate with the user 112. The user characteristic data 342 may also include other information, such as attire or jewelry associated with the user 112. For example, the user characteristic data 342 may include information indicating the user 112 may wear a cowboy hat.

The group data 418 comprises information indicating the user 112 belongs to one or more groups. A group comprises a set of users which are associated with one another. Groups may include but are not limited to families, teams, clubs, work groups, peer groups, workplace shiftmates, and so forth. For example, the users 112 "Alice," "Bob," and "Charlie" may be members of the same family, and thus may be associated as being within a common group designated as "Alpha" in this illustration.

In some implementations the identification system 124 may be configured to generate group data 418. For example the identification system 124 may determine that two or more users 112 have disembarked, embarked, or both disembarked and embarked a particular vehicle 120. Based on this determination the two users 112 may be grouped together. In some implementations the group data 418 may include a weighting or strength of the grouping. For example, repeated occurrences of the same set of users 112 entering and exiting the vehicle 120 may increase the weighting of that association, while a decrease in the number of occurrences over time may reduce the weighting.

The vehicle schedule data 344 depicted in FIG. 5 provides information about arrivals, departures, or both, with regard to the facility 102. The vehicle schedule data 344 may include historical data, schedule data, or predicted data. The historical data provides information about previous arrivals or departures to the facility 102. The schedule data provides information about arrivals or departures which are slated to occur, but have not yet. For example, the user 112 may schedule a time to arrive at the facility 102 to pick up one or more items 104. In comparison, the predicted data comprises information which anticipates or projects a future arrival or departure at the facility 102. In some implementations the predicted data may be generated by the prediction module 326.

The vehicle schedule data 344 may include a vehicle identifier 402, user identifiers 413, date/time of arrival 502, date/time of departure 504, data type 506, and so forth. The date/time of arrival 502 or departure 504 may provide information about when the vehicle 120 has entered or left the facility 102. The data type 506 may be used to designate a particular record or set of information in the vehicle schedule data 344 is historical, scheduled, or predicted.

In some implementations the vehicle schedule data 344 may incorporate information acquired from an external source. The vehicle schedule data 344 may include information associated with a bus schedule, train schedule, freight delivery schedule, and so forth. In some implementations this information may be real time, or near real-time. For example, a trucking company or transit authority may provide updates to estimated arrival times of their vehicles 120.

The user identification data 126 may include information indicative of the user identity, such as the user identifier 413. In some implementations the user identification data 126 may include other information such as a date/time of entry or exit 508 to the facility 102 or a portion thereof. Status information 510 provides information as to whether the user 112 has entered or exited the facility 102. The identification system 124 is configured to generate the user identification data 126 based at least in part on the sensor data 116, as described in this disclosure. In some implementations the user identification data 126 may include a confidence value indicative of reliability of the identification. For example, identification which is based on identification of the vehicle 120 which is associated with the user 112, biometric identification of the user 112, and a correspondence with a predicted arrival based on the vehicle schedule data 344, may be given a high confidence value. In comparison, identification which is based solely on biometric identification of the user 112 may be determined to have a lower confidence value.

The data described above is illustrated in tabular format for ease of illustration, and not by way of limitation. In other implementations, other data structures may be used. For example the data may be stored as linked lists, object database nodes, key-value pairs, and so forth.

Figure 6:
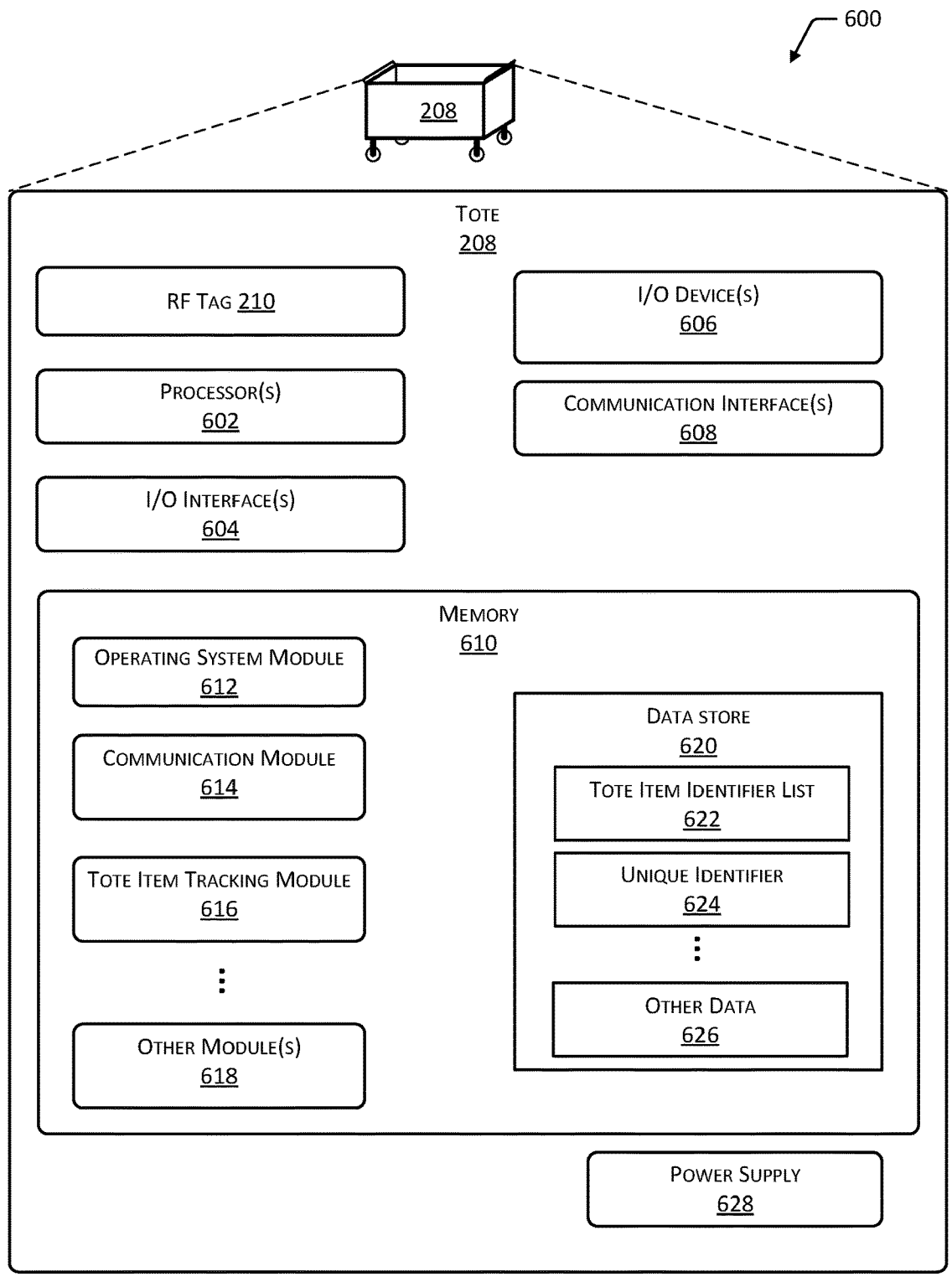
FIG. 6 is a block diagram of a tote, according to some implementations.

FIG. 6 illustrates a block diagram 600 of the tote 208, according to some implementations. The tote 208 may include an RF tag 210. The RF tag 210 may be affixed to, integral with, or is otherwise associated with the tote 208. In some implementations, the tote 208 may have identifiers, tags, or other indicia thereupon. For example, a machine-readable optical code, such as a barcode, may be affixed to a side of the tote 208.

The tote 208 may include one or more hardware processors 602 (processors) configured to execute one or more stored instructions. The processors 602 may comprise one or more cores. The tote 208 may include one or more I/O interface(s) 604 to allow the processor 602 or other portions of the tote 208 to communicate with other devices. The I/O interfaces 604 may include I2C, SPI, USB, RS-232, and so forth.

The I/O interface(s) 604 may couple to one or more I/O devices 606. The I/O devices 606 may include input devices such as one or more of a camera, a microphone, a touch sensor, a button, range camera, accelerometer, gyroscope, magnetometer, tilt sensor, weight sensor, pressure sensor, proximity sensor, and so forth. Other input devices may include RFID readers, NFC readers, barcode scanners, fingerprint readers, and so forth. The I/O devices 606 may also include output devices such as one or more of a display, audio speakers, haptic output device and so forth. In some implementations input and output devices may be combined. For example, a touchscreen display may incorporate a touch sensor and a display device. In some embodiments, the I/O devices 606 may be physically incorporated with the I/O interface 604 or may be externally placed.

The tote 208 may also include one or more communication interfaces 608. The communication interfaces 608 are configured to provide communications between the tote 208 and other devices, routers, access points 232, the servers 204, and so forth. The communication interfaces 608 may include devices configured to couple to PANs, LANs, WANs, and so forth. For example, the communication interfaces 608 may include devices compatible with Ethernet, Wi-Fi, Bluetooth, ZigBee, and so forth.

The tote 208 may also include one or more buses or other internal communications hardware or software that allow for the transfer of data between the various modules and components of the tote 208.

As shown in FIG. 6, the tote 208 includes one or more memories 610. The memory 610 comprises one or more CRSM as described above. The memory 610 provides storage of computer readable instructions, data structures, program modules and other data for the operation of the tote 208. A few example functional modules are shown stored in the memory 610, although the same functionality may alternatively be implemented in hardware, firmware, or as a SOC.

The memory 610 may include at least one OS module 612. The OS module 612 is configured to manage hardware resource devices such as the I/O interfaces 604, the I/O devices 606, the communication interfaces 608, and provide various services to applications or modules executing on the processors 602. The OS module 612 may implement a variation of the Linux operating system, such as Android as promulgated by Google, Inc. Other OS modules 612 may be used, such as the Windows operating system from Microsoft Corporation of Redmond, Washington, the LynxOS from LynxWorks of San Jose, California, and so forth.

Also stored in the memory 610 may be one or more of the following modules. These modules may be executed as foreground applications, background tasks, daemons, and so forth.

A communication module 614 may be configured to establish communications with one or more of the sensors 114, other servers 204, or other devices. The communications may be authenticated, encrypted, and so forth.

The memory 610 may also store a tote item tracking module 616. The tote item tracking module 616 is configured to maintain a list of items 104, which are associated with the tote 208. For example, the tote item tracking module 616 may receive input from a user by way of a touch screen display with which the user may enter information indicative of the item 104 placed in the tote 208. In another example, the tote item tracking module 616 may receive input from one of the I/O devices 606, such as an RFID or NFC reader. The tote item tracking module 616 may send the list of items 104 to the inventory management system 122. The tote item tracking module 616 may also be configured to receive information from the inventory management system 122. For example, a list of items 104 to be picked may be presented within a user interface on the display device of the tote 208. As described above, the inventory management system 122 may be configured to determine the list of items 104 to be picked based at least in part on the user identification data 126.

Other modules 618 may also be stored within the memory 610. In one implementation, a user authentication module may be configured to receive input and authenticate or identify a particular user. For example, the user may enter a personal identification number or may provide a fingerprint to the fingerprint reader to confirm their identity.

The memory 610 may also include a data store 620 to store information. The data store 620 may use a flat file, database, linked list, tree, executable code, script, or other data structure to store the information. In some implementations, the data store 620 or a portion of the data store 620 may be distributed across one or more other devices including the servers 204, other totes 208, network attached storage devices, and so forth.

The data store 620 may store a tote item identifier list 622. The tote item identifier list 622 may comprise data indicating one or more items 104 associated with the tote 208. For example, the list may indicate the items 104, which are present in the tote 208. The tote item tracking module 616 may generate or otherwise maintain a tote item identifier list 622.

A unique identifier 624 may also be stored in the memory 610. In some implementations, the unique identifier 624 may be stored in rewritable memory, write-once-read-only memory, and so forth. For example, the unique identifier 624 may be burned into a one-time programmable non-volatile memory, such as a programmable read-only memory (PROM). In some implementations, the unique identifier 624 may be part of a communication interface 608. For example, the unique identifier 624 may comprise a media access control address associated with a Bluetooth interface.

Other data 626 may also be stored within the data store 620. For example, tote configuration settings, user interface preferences, and so forth may also be stored.

The tote 208 may also include a power supply 628. The power supply 628 is configured to provide electrical power suitable for operating the components in the tote 208. The power supply 628 may comprise one or more of photovoltaic cells, batteries, wireless power receivers, fuel cells, capacitors, and so forth.

Illustrative Processes

The processes described in this disclosure may be performed using one or more statistical techniques. For example, determination of the vehicle identity, the user identity, or both may use one or more classifiers executing on hardware processors. As a result, in some implementations the determinations described below may include, or be based upon, one or more probabilities.

Figure 7:
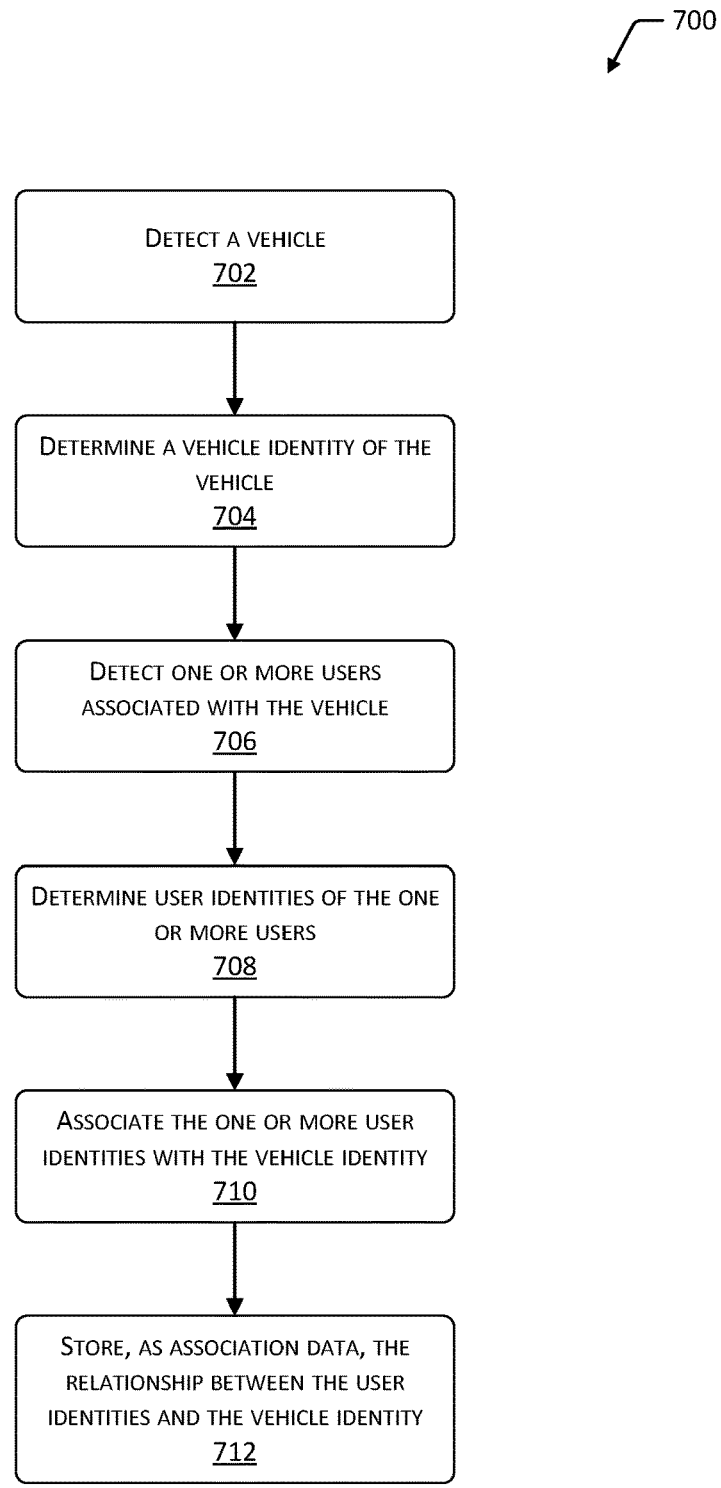
FIG. 7 depicts a flow diagram of a process of generating association data which relates vehicles and users.

FIG. 7 depicts a flow diagram 700 of a process of generating association data 338 which relates vehicles 120 and users 112. The process may be performed at least in part by the identification system 124.

In some implementations, the association data 338 may be generated in an ongoing basis with little or no initial information. For example, vehicles 120 and their corresponding users 112 may be associated over time as they use the facility 102.

Block 702 detects a vehicle 120. For example the recognition module 322 may be configured to process the sensor data 116 and determine that the sensor data 116 is representative of an automobile. Detection of the vehicle 120 may occur as the vehicle 120 approaches the facility 102, such as upon entry to the vehicle area 118.

Block 704 determines the vehicle identity of the vehicle 120. As described above, the analysis module 324 may look to the characteristics expressed in the vehicle data 336 and determine that the detected vehicle 120 is associated with a particular vehicle identifier 402. For example, the analysis module 324 may analyze the vehicle registration data 406, the color 412, and so forth. The vehicle 120 may be identified at the facility 102 or on approach to the facility 102.

In some implementations the vehicle identity may be determined by acquiring registration data of the vehicle 120. For example the license plate may be read using optical character recognition, or an RFID tag embedded within the license plate or elsewhere in the vehicle 120 may be interrogated and provide the registration data. The resulting data may then be stored.

Block 706 detects one or more users 112 associated with the vehicle 120. Continuing the example, the recognition module 322 may determine that the objects emerging from the vehicle 120 are three people. The association between the users 112 and the vehicle 120 may be based on common use of the vehicle 120. For example, the association may be based on detecting the one or more users 112 exiting or entering the vehicle 120, walking to or from the vehicle 120, and so forth. This may include use by several users 112 at the same time, or common use of the same vehicle 120 by different users 112 at different times.

Block 708 determines user identities of the one or more users 112. The analysis module 324 may be configured to search the user characteristic data 342 stored in the data store 332 to find the user identity which matches the user 112. In some implementations, this may include searching all of the user characteristic data 342.

In some situations the user 112 may be previously unidentified with regard to the identification system 124. In these situations, the user 112 may participate in a registration or enrollment process in which the user's identity is established and stored by the identification system 124. For example the user interface module 328 may provide a user interface to acquire user identification information from the user 112. Continuing the example, the user interface may request the user 112 enter various information such as name, payroll number, and so forth. The input may be acquired and stored.

Block 710 associates the one or more user identities with the vehicle identity. For example, the vehicle 120 of "7" is associated with the user identifier 413 for user 112 "Charlie" because Charlie arrived at the facility 102 in that vehicle 120.

In some implementations, the association between a user 112 and a vehicle 120 may also be based on other activities or information. For example, the user 112(1) may exit the vehicle 120(1) and meet up with the user 112(2) inside the facility 102. Based at least in part on this meeting, the user 112(2) may be associated with the vehicle 120(1).

Block 712 stores, as the association data 338, the relationship between the vehicle identifier 402 and the user identifier 413.

In other implementations, the association data 338 may be generated based on other information sources. For example, vehicle registration records may be accessed to provide vehicle data 336 and information about an owner of record, which may be assumed to be the user 112. Upon a visit to the facility 102, the assumption may be proven or disproven, and the association data 338 updated accordingly.

In some implementations, the detection of the vehicle, the users, or both may be omitted. In these implementations, an identification classifier may be blindly run on the sensor data 116. The identification classifier may generate a score for the sensor data 116 or a portion thereof. The sensor data 116, or a portion thereof which has a highest score may be output. For example, the sensor data 116 comprising images and sub-images from an imaging device 214 acquiring pictures of vehicles entering the vehicle area 118 may be processed using a vehicle identification classifier. Images which have a highest score in a particular period of time, within a particular subset of the sensor data 116, and so forth, may be designated as identifying a vehicle.

Figure 8:
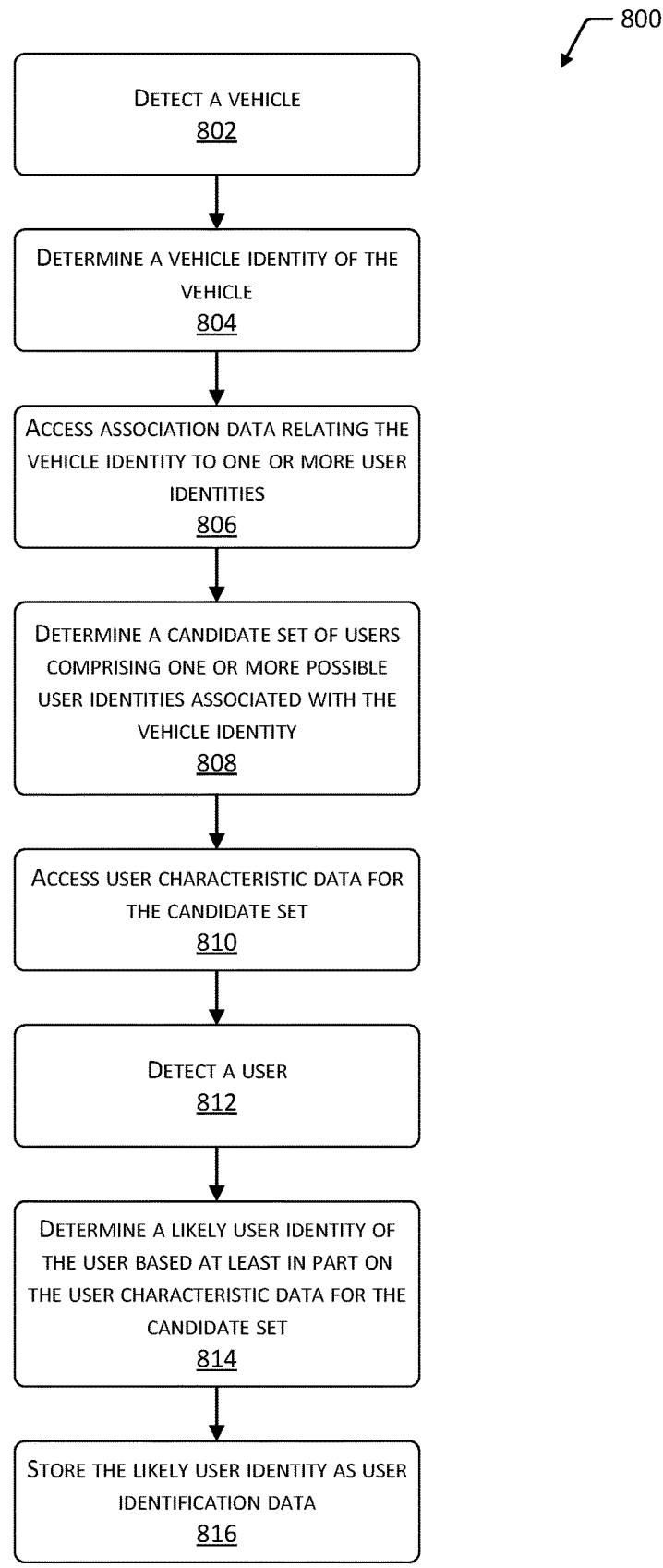
FIG. 8 depicts a flow diagram of a process of identifying a user based at least in part on the vehicle of the user.

FIG. 8 depicts a flow diagram 800 of a process of identifying a user 112 based at least in part on the vehicle 120 of the user 112. The process may be performed at least in part by the identification system 124.

Block 802 detects a vehicle 120. For example, the recognition module 322 may be configured to process an image acquired by an imaging sensor such as a camera to determine a bus is present. The camera may be configured to acquire the image of the vehicle 120 upon at least one of approach or entry to the vehicle area 118, such as a parking lot or parking area of the facility 102.

As described above, in some implementations, the detection of the vehicle 120 may be omitted, and an identification classifier may process the sensor data 116. The identification classifier may provide as output sensor data 116 which is likely to contain the vehicle 120. For example, the output sensor data 116 may provide an image from a set of images which has a highest score indicating the presence of a vehicle 120 in the image.

Block 804 determines the vehicle identity of the vehicle 120. As described above, the analysis module 324 may look to the characteristics expressed in the vehicle data 336 and determine that the detected vehicle 120 is associated with a particular vehicle identifier 402. For example, the vehicle identity may be determined by acquiring registration data from the vehicle 120 by reading the license plate using optical character recognition, or interrogating an RFID tag associated with the vehicle 120. In some implementations the vehicle identity may be less than determinate of a unique conveyance. For example, license plate numbers may be obscured on several vehicles such that the vehicle identity is based on other characteristics. Continuing the example, the vehicles may be distinguished on the basis of their make 408, model 410, color 412, distinguishing characteristics such as dents, and so forth.

Block 806 accesses the association data 338. As described above the association data 338 provides a relationship between the vehicle identity and one or more user identities.

Block 808 determines a candidate set 340. As described above, the candidate set 340 comprises one or more possible user identities associated with the vehicle identity. In one implementation, the determination of the candidate set 340 may include accessing the association data 338. The association data 338 may be queried to determine user identities which match the vehicle identity. The results of this query, which include the matching user identities, may be included in the candidate set 340. As described above, in some implementations the association data 338 may include a confidence metric. The determination of the candidate set 340 may be based at least in part on this confidence metric. For example, associations between vehicle identifiers 402 and user identifiers 413 which are below a threshold value of the confidence metric may be omitted from the determination of the candidate set 340.

In some implementations, the determination of the candidate set 340 may be based at least in part on the vehicle schedule data 344. The prediction module 326 may be configured to access the vehicle schedule data 344 including the historical data associated with previous arrivals of the vehicle 120 at the facility 102. The prediction module 326 may determine a probability of arrival of the one or more user identities associated with the vehicle identity. The determination of the candidate set 340 may be based at least in part on the probability of arrival, such that the user identities above a threshold probability are included in the candidate set 340. For example, the prediction module 326 may determine that the user 112(1) has a probability of 0.90 of visiting the facility 102 this morning between 9 AM and 10 AM using the vehicle 120(1) while the user 112(2) has a probability of 0.35 of visiting the facility 102 at the same time and date. The threshold probability in this example may be set to 0.80, such that the user identity of the user 112(1) is included in the candidate set 340, while the user identity of the user 112(2) is not. The threshold probability may be static or dynamically configured.

Block 810 accesses the user characteristic data 342 for the user identities indicated by the candidate set 340. For example, the user characteristic data 342 may include biometric information for the user identities of the candidate set 340. With this data accessed, the analysis module 324 is now provided with a subset of possible user identities to analyze for determination of the identity of the user 112.

Block 812 detects a user 112. For example, the recognition module 322 may process an image acquired by an imaging sensor such as a camera to determine that one of the objects emerging from the vehicle 120 is a person, such as the user 112. In another example, the recognition module 322 may determine that an object approaching a portal of the facility 102 is a person. Continuing the example, the camera may be configured to acquire the image as the user 112 approaches an entry of the facility 102 after disembarking from the vehicle 120.

As described above, in some implementations, the detection of the person may be omitted, and an identification classifier may process the sensor data 116. The identification classifier may provide as output sensor data 116 which is likely to include the image of the person. For example, the output sensor data 116 may provide an image from a set of images which has a highest score indicating the presence of a person in the image.

Block 814 determines a likely user identity of the user 112 based at least in part on the user characteristic data 342 for the user identities indicated in the candidate set 340. The analysis module 324 may be configured to search the user characteristic data 342 of the user identities indicated in the candidate set 340. As described above, the user characteristic data 342 may be stored in the data store 332. The analysis may include a comparison of the sensor data 116 with the biometric data 414, ID tag 416, and so forth. In some implementations the determination of the user identity may be such that the user identity of the user 112 is definitive with little or no uncertainty.

The likely user identity may be determined for all of the users 112, or just a portion of the users 112. For example, some users 112 may be unidentifiable due to obscuration of their faces by articles of clothing or facial hair, which prevents reliable facial recognition and subsequent identification.

In some situations the user identity of the user 112 may not be present in the candidate set 340. For example, the characteristics of the user 112 may not match those as indicated by the candidate set 340, such as the user 112 may be driving a new vehicle 120 for which no association data 338 between the vehicle 120 and the user 112 has been recorded. In this situation, the block may determine that the user identity of the user 112 is absent from the candidate set 340. The process may proceed as described above with regard to FIG. 7 to associate the vehicle identity and the user identity. For example, the user identity may be determined by providing a user interface and storing the resulting user inputs.

In some implementations the user 112 may be detected and identified prior to exiting the vehicle 120. For example, sensor data 116 indicative of the user 112 may be acquired while the vehicle 120 is traversing the vehicle area 118 or parked therein. Continuing the example, images of the user 112 may be acquired through the windows of the vehicle 120 and provided to the identification system 124.

Block 816 stores the determined user identity as user identification data 126. For example, the user identification data 126 may include the user identifier 413.

The user identification data 126 may be used by an additional block to configure at least a portion of the facility 102 based at least in part on the user identity. The configuration may include one or more of: moving one or more items 104 associated with the user 112 within the facility 102, presenting data associated with the user 112 on one or more displays 228, notifying one or more agents of the facility as to arrival of the user 112, configuring a tote 208 for use by the user 112, and so forth.

For example, based on the user identification indicating the user 112(1) has entered the facility 102, the inventory management system 122 may configure and reserve a particular tote 208 for use based on the preferred settings of the user 112(1). The configuration may improve the experience of the user 112 with regard to accessing the functions and capabilities of the facility 102.

Figure 9:
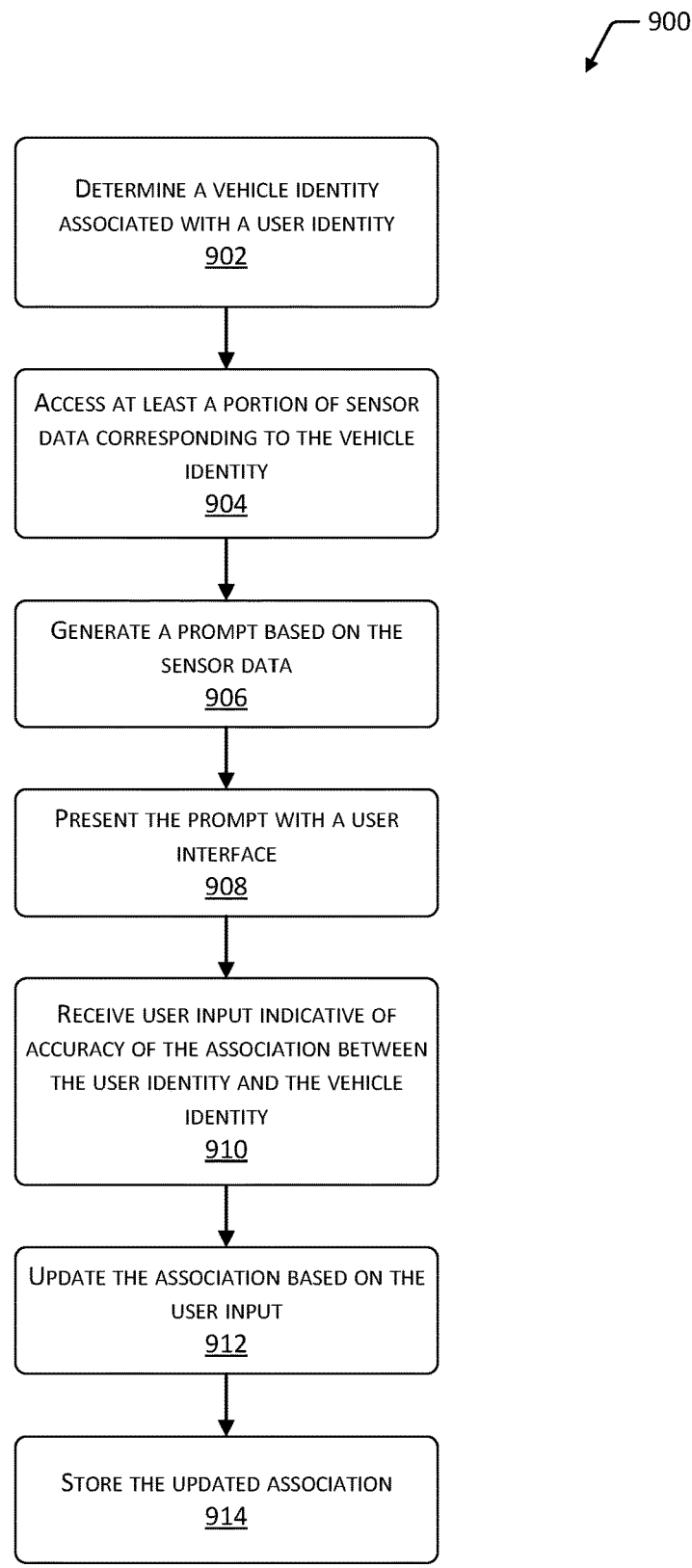
FIG. 9 depicts a flow diagram of a process of confirming the association data by presenting a user interface and receiving user input.

FIG. 9 depicts a flow diagram 900 of a process of confirming the association data 338 by presenting a user interface and receiving user input. The process may be performed at least in part by one or more of the identification system 124 or the user interface module 328. This process may be incorporated into a registration or enrollment process used to add users 112, vehicles 120, or both to the identification system 124.

Block 902 determines a vehicle identity associated with a user identity. For example, the association data 338 may be accessed using the user identity and retrieving an associated vehicle identity.

Block 904 accesses at least a portion of the sensor data 116 corresponding to the vehicle identity associated with the user identity. For example the sensor data 116 including one or more images of the vehicle 120 may be retrieved from the data store 332.

Block 906 generates a prompt based on the vehicle sensor data. For example, the prompt may include images of three vehicles at 120(1), 120(2), and 120(3), at least one of which is associated with the user identity in the association data 338. In another example, the prompt may include text including at least a partial description of the vehicle 120.

Block 908 presents the prompt with a user interface. The user interface module 328 may be configured to present the prompt on the display 228. Other devices such as a tablet, smart phone, personal computer, and so forth may also present the user interface.

Continuing the example above, the user interface may be configured to prompt the user 112 to select which of the three vehicles 120(1)-(3) is theirs. The prompt presented to the user 112 may request information including but not limited to, a description of the vehicle, an image of at least a portion of the vehicle, at least a portion of a license plate number, a representation of the vehicle, and so forth. For example, the prompt may include the first three digits of the license plate number and ask the user 112 to confirm that this is the license plate of their vehicle 120. In another example, the representation of the vehicle may comprise a stock photo of that vehicle as provided by a manufacturer or other third-party. This representation may be a photo, or a computer-generated rendering of the vehicle 120.

In some implementations at least a portion of the information presented by the user interface module 328 in the user interface may be obfuscated. For example, images of the vehicle 120 may be edited to remove or obscure faces of individuals in or near the vehicle 120.

Block 910 receives user input associated with the prompt. In some implementations, the user input may comprise information indicative of accuracy of the association between the user identity and the vehicle identity. For example, the user input may indicate that the user identity associated with user 112 is correctly associated with the vehicle identity of the vehicle 120.

Block 912 updates the association based on the user input. For example, the association data 338 may be updated to associate the user identity of user 112 with the vehicle identity of vehicle 120.

Block 914 may store the updated association. For example, the updated association data 338 may be stored in the data store 332.

Figure 10:
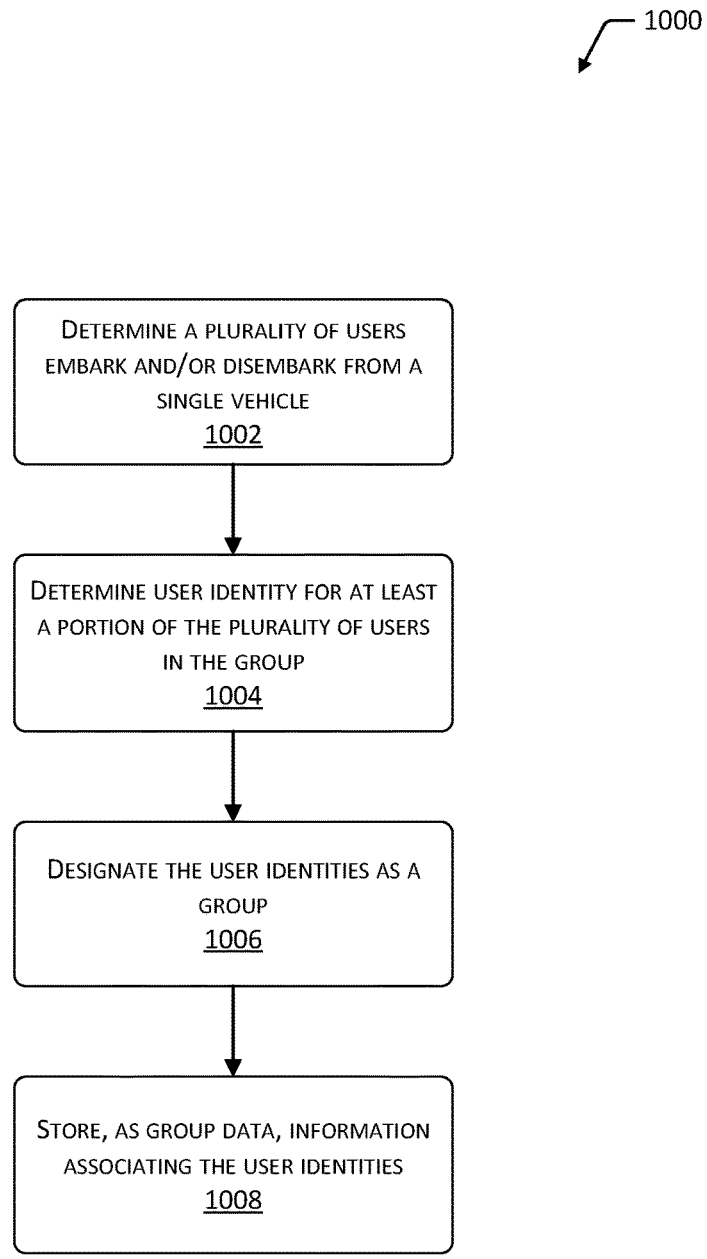
FIG. 10 depicts a flow diagram of a process of determining a group of users based on use of a common vehicle.

FIG. 10 depicts a flow diagram 1000 of a process of determining a group of users 112 based on use of a common vehicle 120. The process may be performed at least in part by the identification system 124.

Block 1002 determines a plurality of users 112 embark, disembark, or embark and disembark the vehicle 120. For example, several users 112 may be detected exiting a vehicle 120. In another example, several users 112 may be detected entering the vehicle 120.

Block 1004 determines user identities of at least a portion of the users 112. For example facial recognition techniques may be used by the identification module 320 to detect and then associate a particular face to the particular user identity.

Block 1006 designates the user identities as members of a group. The designation of members of a group may be based at least in part on the type 404 of vehicle 120. For example, a group of users 112 disembarking from a bus may be members of a particular group, such as a family. In some implementations, a group reliability value may be generated. The group reliability value is configured to provide information, such as a probability or probability distribution, which is indicative of the accuracy of a determination that a particular user identity is a member of the group.

In some implementations the designation of members of a group may be based at least in part on the motion of the members relative to one another within the facility 102. For example, the position of the users 112(1)-(4) may be determined and recorded over time by a positioning system. Should the users 112(1)-(4) remain together within the facility 102, they may be designated as members of a group. In comparison, should the users 112(1)-(4) separate from one another after entry to the facility 102, they may not be designated as members of a group.

Block 1008 stores, as the group data 418, information associating the user identities of the group with one another. For example, the group data 418 of the user characteristic data 342 of the user identities in the group may be updated to a common value.

Figure 11:
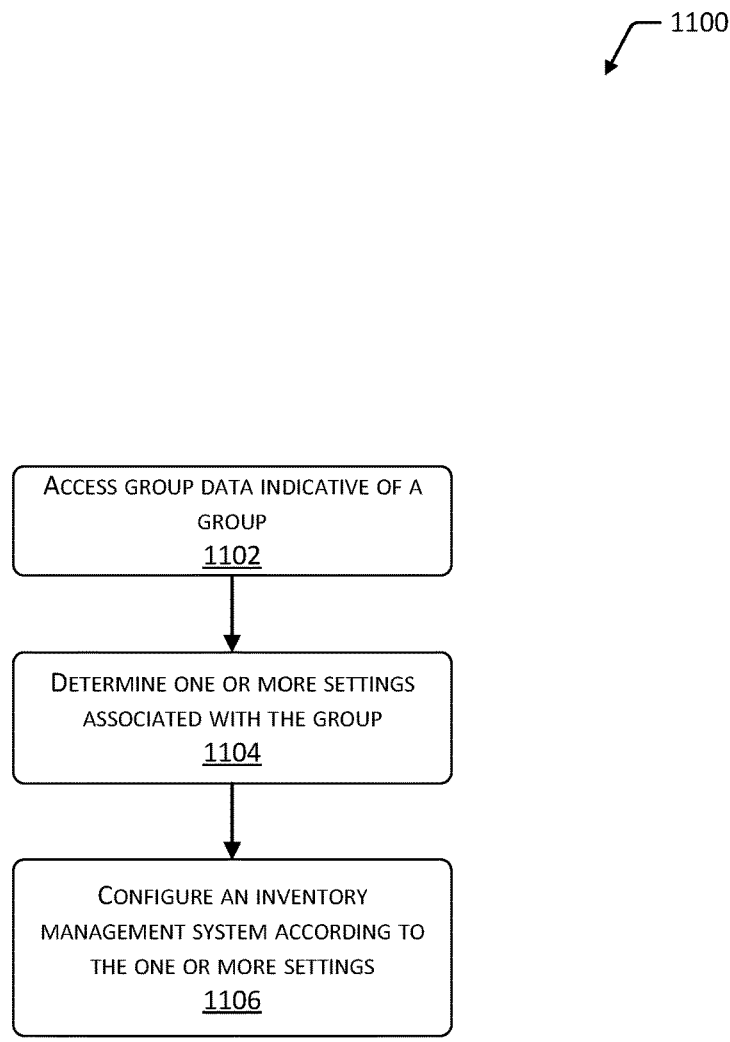
FIG. 11 depicts a flow diagram of a process of configuring an inventory management system based on the group of users.

FIG. 11 depicts a flow diagram 1100 of a process of configuring an inventory management system 122 based on the group of users. The process may be performed at least in part by the inventory management system 122, the identification system 124, or both.

As described above, the facility 102 may be configured to provide particular services or functions to particular users 112. For example, based on the user identity of the user 112 being determined by the identification system 124, the inventory management system 122 may begin directing other users 112 to pick items for pickup by the user 112.

Block 1102 accesses the group data 418. For example, the user identifiers 413 associated with a group may be retrieved from the user characteristic data 342.

Block 1104 determines settings associated with the group data 418. For example, the settings may be retrieved from the data store 332. In one implementation, the settings may include one or more of a payment account, determine one or more discounts associated with the group, item preferences, a preferred shipment method, or a distribution policy of items on a pick list between members of the group. For example, the group may comprise members of a common enterprise which obtains services from the facility 102. This group may specify settings such as payment for one or more items 104 obtained from the facility 102 will be billed to a single account associated with the common enterprise. Continuing the example, item preferences may indicate particular items 104 which have been previously picked by the group. Based on these preferences, these particular items 104 may be relocated to a more convenient inventory location 206, such as being consolidated to adjacent racks for picking. These settings may thus be used to customize operation of the inventory management system 122 for the members of the group.

Block 1106 configures the inventory management system 122 of the facility 102 according to the settings. Continuing the example, items 104 which are picked by users 112 who are members of the group will be billed to the single account specified by the settings.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    determining first data associated with one or more vehicle identifiers, the first data comprising:
        a vehicle identifier associated with each of the one or more vehicle identifiers, and
        vehicle schedule data for one or more vehicles associated with the one or more vehicle identifiers, wherein the vehicle schedule data includes one or more of:
            historical data indicative of a previous arrival or departure of one or more of the one or more vehicles to a facility,
            scheduled data indicative of a scheduled arrival or departure of one or more of the one or more vehicles to the facility, or
            predicted data indicative of a predicted arrival or departure of one or more of the one or more vehicles to the facility;
    detecting a vehicle at a vehicle area of the facility; and
    determining a set of potential vehicle identifiers corresponding to the vehicle, based on at least a portion of the first data.

2. The method of claim 1, wherein:
    the historical data further includes one or more of:
        a date or time that the one or more of the one or more vehicles previously arrived at the facility, or
        a date or time that the one or more of the one or more vehicles previously departed the facility;
    the scheduled data further includes one or more of:
        a date or time that the one or more of the one or more vehicles is scheduled to arrive at the facility, or
        a date or time that the one or more of the one or more vehicles is scheduled to depart the facility; and
    the predicted data further includes one or more of:
        a date or time that the one or more of the one or more vehicles is predicted to arrive at the facility, or a date or time that the one or more of the one or more vehicles is predicted to depart the facility.

3. The method of claim 1, further comprising:
determining an arrival time of the vehicle to the vehicle area;
determining second data that corresponds with the arrival time of the vehicle, wherein the second data is a subset of the first data;
determining vehicle identifiers associated with the second data; and
wherein the set of potential vehicle identifiers comprises the vehicle identifiers that are associated with the second data.

4. The method of claim 1, further comprising:
determining association data that indicates one or more relationships between the one or more vehicle identifiers and one or more user identifiers; and
storing the association data.

5. The method of claim 1, further comprising:
determining a first set of user identifiers associated with the vehicle identifiers in the set of potential vehicle identifiers;
determining user characteristic data for the user identifiers in the first set of user identifiers, wherein the user characteristic data comprises one or more of:
  biometric data,
  attire data, or
  one or more values of an identification tag;
determining a user approaching an entry to the facility; and
determining, from the first set of user identifiers, a user identifier associated with the user, based at least in part on one or more characteristics of the user and the user characteristic data.

6. The method of claim 1, further comprising:
determining one or more characteristics associated with the vehicle, the one or more characteristics comprising one or more of:
  a type of the vehicle,
  a registration of the vehicle,
  a make of the vehicle,
  a model of the vehicle, or
  a color of the vehicle; and
determining the vehicle identifier associated with the vehicle, from the set of potential vehicle identifiers, based on the one or more characteristics associated with the vehicle.

7. The method of claim 6, further comprising:
determining association data, the association data indicative of one or more relationships between vehicle identifiers and corresponding user identifiers or account identifiers; and
determining a user identifier or account identifier associated with the vehicle identifier of the vehicle, based at least on the association data.

8. A system comprising:
a first sensor configured to acquire a first image of at least a portion of a vehicle at a vehicle area of a facility; and
a computing system in communication with the first sensor, the computing system comprising:
  a memory storing non-transitory computer-executable instructions; and
  one or more hardware processors configured to execute the non-transitory computer-executable instructions to:
    detect the vehicle as represented in the first image;
    access vehicle schedule data for one or more vehicles associated with one or more vehicle identifiers, wherein the vehicle schedule data includes an arrival date and time or a departure date and time associated with the one or more vehicles;
    determine a first set of possible vehicle identifiers based on the vehicle schedule data;
    determine one or more characteristics of the vehicle;
    determine, from the first set of possible vehicle identifiers, a vehicle identifier of the vehicle based on the one or more characteristics of the vehicle;
    access association data indicative of one or more relationships between the one or more vehicle identifiers and one or more account identifiers; and
    determine an account identifier associated with the vehicle identifier of the vehicle, based on the association data.

9. The system of claim 8, the one or more hardware processors to further execute the non-transitory computer-executable instructions to:
determine one or more user identifiers associated with the account identifier; and
determine a status of whether one or more of the one or more user identifiers has entered or exited the facility.

10. The system of claim 8, the one or more hardware processors to further execute the non-transitory computer-executable instructions to:
determine an order associated with the account identifier, wherein the order is indicative of one or more items; and
associate the order with the vehicle identifier of the vehicle.

11. The system of claim 8, the one or more hardware processors to further execute the non-transitory computer-executable instructions to:
determine the association data indicative of the one or more relationships between the one or more vehicle identifiers and the one or more account identifiers;
store the association data; and
wherein the association data is retrieved from storage to determine the account identifier associated with the vehicle identifier of the vehicle.

12. The system of claim 8, wherein:
the one or more characteristics of the vehicle comprise one or more of:
  a type of the vehicle,
  a registration of the vehicle,
  a make of the vehicle,
  a model of the vehicle, or
  a color of the vehicle.

13. The system of claim 8, wherein the vehicle schedule data further includes one or more of:
  a historical date and time that one or more of the one or more vehicles has previously arrived at the vehicle area of the facility,
  a scheduled date and time that one or more of the one or more vehicles is scheduled to arrive at the vehicle area of the facility,
  a predicted date and time that one or more of the one or more vehicles is predicted to arrive at the vehicle area of the facility,
  a historical date and time that one or more of the one or more vehicles has previously departed from the vehicle area of the facility,
  a scheduled date and time that one or more of the one or more vehicles is scheduled to depart the vehicle area of the facility, or a predicted date and time that one or more of the one or more vehicles is predicted to depart the vehicle area of the facility.

14. The system of claim 8, further comprising:
a second sensor configured to acquire a second image of at least a portion of a user upon approaching an entry to the facility; and
the one or more hardware processors to further execute the non-transitory computer-executable instructions to:
  detect the user upon approaching the entry to the facility;
  determine one or more characteristics of the user;
  determine one or more user identifiers associated with the account identifier, based on the association data;
  access user characteristic data corresponding to the one or more user identifiers associated with the account identifier, wherein the user characteristic data comprises one or more of:
    biometric data,
    attire data, or
    one or more values of an identification tag; and
  determine a user identifier of the user, from the one or more user identifiers associated with the account identifier, based on the one or more characteristics of the user and the user characteristic data.

15. A system comprising:
one or more sensors at a facility configured to generate vehicle sensor data indicative of a vehicle at a vehicle area of the facility; and
a computing system in communication with the one or more sensors, the computing system including:
  a memory storing non-transitory computer-executable instructions; and
  one or more hardware processors configured to execute the non-transitory computer-executable instructions to:
    access vehicle schedule data for one or more vehicles, wherein the vehicle schedule data includes one or more of:
      a scheduled date and time that one or more of the one or more vehicles is scheduled to arrive at the facility, or
      a predicted date and time that one or more of the one or more vehicles is predicted to arrive at the facility;
    detect the vehicle at the vehicle area of the facility;
    determine one or more characteristics of the vehicle, wherein the one or more characteristics of the vehicle comprise one or more of:
      a type of the vehicle,
      a body style of the vehicle,
      a registration of the vehicle,
      a make of the vehicle,
      a model of the vehicle,
      a color of the vehicle,
      body damage associated with the vehicle,
      bumper stickers or other decals affixed to the vehicle,
      one or more identifiers associated with communication interfaces of the vehicle,
      aftermarket add-ons to the vehicle,
      window tinting associated with the vehicle,
      a weight of the vehicle,
      a license plate of the vehicle,
      a frame of the license plate of the vehicle, or
      a style of wheels associated with the vehicle; and
    determine a set of possible vehicle identifiers based on the one or more characteristics of the vehicle and the vehicle schedule data.

16. The system of claim 15, the one or more hardware processors to further execute the non-transitory computer-executable instructions to:
  access association data indicative of one or more relationships between vehicle identifiers and user identifiers; and
  determine, from the association data, possible user identifiers associated with those vehicle identifiers in the set of possible vehicle identifiers.

17. The system of claim 15, the one or more hardware processors to further execute the non-transitory computer-executable instructions to:
  determine that one of the vehicle identifiers in the set of possible vehicle identifiers corresponds to the vehicle, based on one or more types of data associated with the vehicle.

18. The system of claim 17, the one or more hardware processors to further execute the non-transitory computer-executable instructions to:
  access association data that indicates one or more relationships between vehicle identifiers and user identifiers; and
  determine, based on the association data, one or more user identifiers associated with the one vehicle identifier that corresponds to the vehicle.

19. The system of claim 15, the one or more hardware processors to further execute the non-transitory computer-executable instructions to:
  determine the vehicle is detected at the vehicle area at a first time;
  determine, from the vehicle schedule data, a second set of vehicle identifiers that correspond with the first time;
  determine a subset of possible vehicle identifiers, from the set of possible vehicle identifiers, that correspond with those vehicle identifiers in the second set of vehicle identifiers; and
  determine a vehicle identifier of the vehicle as one of the vehicle identifiers in the subset of possible vehicle identifiers.

20. The system of claim 15, the one or more hardware processors to further execute the non-transitory computer-executable instructions to:
  access an image of a user in the vehicle;
  determine one or more characteristics of the user in the vehicle;
  determine a set of user identifiers associated with those vehicle identifiers in the set of possible vehicle identifiers;
  access user characteristic data for the user identifiers in the set of user identifiers, wherein the user characteristic data comprises one or more of:
    biometric data,
    attire data, or
    one or more values of an identification tag; and
  determine, from the set of user identifiers, a user identifier of the user in the vehicle, based on the one or more characteristics of the user in the vehicle and the user characteristic data.

21. A method comprising:
acquiring scheduling information from one or more sources;
determining an association between at least a portion of the scheduling information, one or more vehicle identifiers, and one or more user identifiers; and generating, based at least on the association, vehicle schedule data.

\* \* \* \* \*